US006836890B1

(12) United States Patent
Watts, Jr. et al.

(10) Patent No.: US 6,836,890 B1
(45) Date of Patent: Dec. 28, 2004

(54) METHODS AND SYSTEMS FOR MESSAGE TRANSLATION AND PARSING OF DATA STRUCTURES IN A DISTRIBUTED COMPONENT ARCHITECTURE

(75) Inventors: Lealon E. Watts, Jr., Alta Loma, CA (US); Jerry A. Waldorf, Woodland Hills, CA (US); Nathan K. Inada, Pasadena, CA (US); Rangaswamy Srihari, Arcadia, CA (US); Samuel N. Domingo, Burbank, CA (US)

(73) Assignee: Seebeyond Techonogy Corporation, Monrovia, CA (US)

( * ) Notice: Subject to any disclaimer, the term of this patent is extended or adjusted under 35 U.S.C. 154(b) by 833 days.

(21) Appl. No.: 09/704,275

(22) Filed: Nov. 1, 2000

(51) Int. Cl.[7] .............................................. G06F 9/54
(52) U.S. Cl. ...................................... 719/313; 709/246
(58) Field of Search .............................. 719/310–320, 719/328; 709/206, 246; 710/52–57

(56) References Cited

U.S. PATENT DOCUMENTS 6,067,579 A * 5/2000 Hardman et al. ........... 719/328
6,529,972 B1 * 3/2003 Coffman ...................... 710/56
6,668,284 B1 * 12/2003 Parkhurst .................... 719/313
2002/0035606 A1 * 3/2002 Kenton ....................... 709/206

OTHER PUBLICATIONS

"Method for Parsing an Arbitrary Hierarchical Data Stream", IBM Technical Disclosure Bulletin, Feb. 1978, vol. 20, Issue No. 9, pp. 3679–3682.*

* cited by examiner

Primary Examiner—St. John Courtenay III
(74) Attorney, Agent, or Firm—Fish & Richardson P.C.

(57) ABSTRACT

The present invention is related to systems and methods that parse and/or translate inbound messages into outbound messages such that disparate computer systems can communicate intelligibly. In one embodiment, a system recursively parses the inbound message such that relatively fewer outbound message structure definitions are required and advantageously decreases the usage of resources by the system. Further, one system in accordance with the present invention allows an operator to configure the identity of a delimiter in the inbound message. The delimiter can span multiple characters and includes the logical inverse of a set of delimiters. The outbound message can be accessed at nodes within a hierarchy, as well as at leaves. Thus, a user need not know the precise location of data within the outbound message. A set of updating rules further permits the updating of an outbound message without having to re-parse an entire inbound message.

20 Claims, 19 Drawing Sheets

402 — IN | \rABE|B.|CHRISTO|\r|100^MAIN STREET^4^CALIFORNIA|90000|

| *FIG. 11B₁* | *FIG. 11B₂* |

*FIG. 11B*

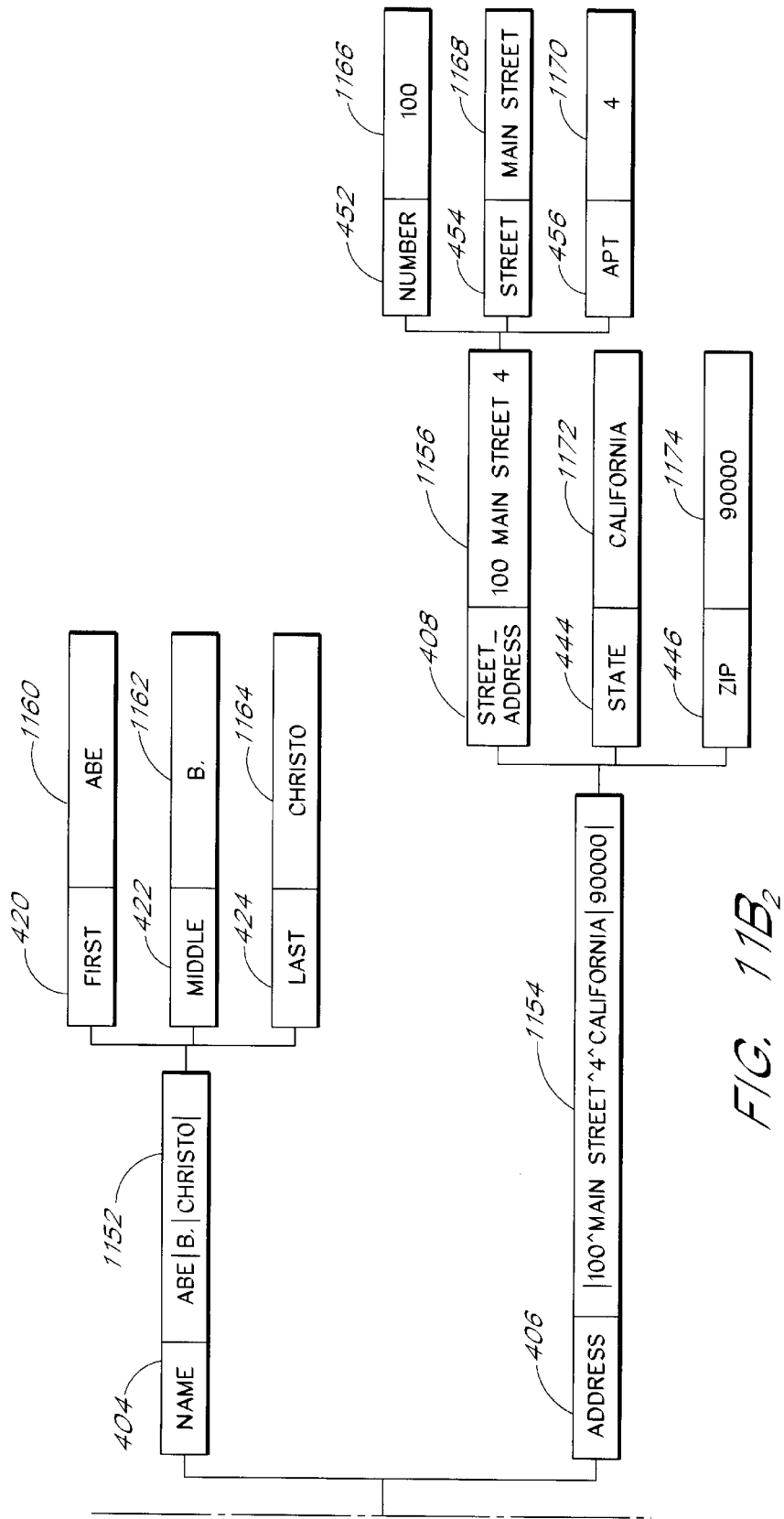
FIG. 11B₂

METHODS AND SYSTEMS FOR MESSAGE TRANSLATION AND PARSING OF DATA STRUCTURES IN A DISTRIBUTED COMPONENT ARCHITECTURE

BACKGROUND OF THE INVENTION

1. Field of the Invention

The present invention is generally related to electronic messaging and in particular, to electronic messaging in a networked environment.

2. Description of the Related Art

Modern businesses rely heavily on computer systems. Businesses frequently need one computer system to communicate with a second computer system, or for one application to communicate with another.

Unfortunately, computer systems, operating systems, and applications often lack sufficient uniformity to allow the communication to easily occur. One of the problems that has been encountered is that different computer systems, operating systems, and applications often use different and incompatible formats and messaging standards, i.e., one computer does not speak the other computer's language. The problem can be exacerbated as platforms shift, applications and equipment become obsolete, standards change, business partners change, and so on. Proprietary message definitions are also common and can also result in incompatible message formats between systems.

One technique for addressing this problem is to use software, often termed "Middleware," that converts or maps an inbound message from a first system to an outbound message for a second system. After conversion, the outbound message is readable by the second system.

Conventional middleware solutions have many drawbacks. Conventional middleware systems map an entire inbound message to an inbound message structure in one large resource intensive step. When the inbound message is relatively large, e.g., several megabytes, mapping of the inbound message can consume a relatively large amount of memory for a relatively long period of time. When the system is busy mapping a large inbound message in one long step, the system may not be able to service a smaller, but higher priority message in an acceptably prompt manner.

A further disadvantage of a conventional middleware solution is that data in the inbound message structure can be difficult to extract. Conventional middleware solutions follow a simple, but rigid, set of rules that maintains data only in leaves of a tree structure hierarchy. Nodes of a conventional middleware solution do not contain data. Hence, when a user or another system desires to access data, the user navigates up and down through the tree structure hierarchy until the leaves with data are found. The process can be frustrating and time consuming.

A further disadvantage of conventional middleware solutions is that the structure of the mapping operation is predefined and inflexible. Thus, a system analyst predicts all combinations of mapping structures and creates those structures. When an inbound message does not correspond to an existing predefined structure, the system analyst creates a new mapping structure to facilitate the mapping of the inbound message. As a result, the system stores a myriad of mapping structures and when needed, the system tests each structure for compatibility with the inbound message.

SUMMARY OF THE INVENTION

Embodiments of the present invention efficiently parse or translate inbound messages into outbound messages such that disparate computer systems can communicate intelligibly.

Embodiments of the present invention can efficiently reuse existing message structure and advantageously adapt the behavior of the message structure to new message requirements. For example, single character delimiters of a message structure can be redefined such as to correspond to compound character delimiters, such as those found in HTML and XML messages. A user can also advantageously access data in both nodes and leaves and thus does not need to know the exact location of stored data. One method according to an embodiment of the invention advantageously updates a message structure, containing data in both nodes and leaves, without having to reparse an entire inbound message, thus preserving valuable resources such as memory space and CPU cycles for other tasks. Another method according to an embodiment of the invention recurses a message structure such that relatively fewer message structures can adapt to a relatively greater variety of message formats, thus allowing the system to reduce the amount of memory dedicated to storing message structures and to reduce the number of different message structures that are tested for compatibility with a message.

One system in accordance with the present invention flexibly permits an operator to configure the identity of characters used as delimiters in the inbound message. A delimiter can span multiple characters and includes the logical inverse of a set of delimiters.

One aspect of the present invention is a system that permits the selecting parsing of a portion of an inbound message, enhancing efficiency by preserving time and resources that would otherwise be consumed while parsing undesired portions. In one embodiment, a user is permitted to specify a byte position within a message from which to start parsing, and the user also specifies a node within a message structure used to parse the structure.

Another aspect of the present invention is a system that permits a structured event (the inbound message as mapped to an inbound message structure) to be accessed at nodes within a hierarchy, as well as leaves. Thus, a user need not know the precise location of data within the structured event. A set of-updating rules further permits the updating of an outbound message without having to re-parse an entire inbound message.

One system recursively parses the inbound message such that relatively fewer inbound message structure definitions are required and advantageously decreases the usage of resources by the system. Recursive parsing allows for the parsing of inbound messages without necessarily having to predefine a fixed message structure that fits the inbound message. One embodiment further allows access to data in a recursively generated message structure.

BRIEF DESCRIPTION OF THE DRAWINGS

These and other features of the invention will now be described with reference to the drawings summarized below. These drawings and the associated description are provided to illustrate preferred embodiments of the invention, and not to limit the scope of the invention.

FIG. 11B consists of FIGS. $11B_1$ and $11B_2$ and illustrates the fixed message structure of FIG. 4A populated with data in both nodes and leaves.

DETAILED DESCRIPTION OF PREFERRED EMBODIMENTS

Although this invention will be described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

In contrast to conventional middleware approaches that suffer from a lack of flexibility, one aspect of the novel middleware technique disclosed herein accounts for the uncertainty of the future by allowing a user, such as a system analyst, to easily define a delimiter to configure the system to a new messaging standard. Such a configuration includes allowing the definition of the delimiter to correspond to multiple character delimiters such as the delimiters used in Hypertext Markup Language (HTML) and Extensible Markup Language (XML).

Conventional middleware techniques also consume valuable resources, both human and computer, with little regard to efficiency. One conventional middleware technique requires that a system analyst anticipate every message format that the middleware solution is to parse, and then build an inbound message structure to accommodate the message format. When encountering a new message not falling within an existing message format, the conventional middleware technique responds with an error and the system analyst has to create a new inbound message structure.

One embodiment of the present invention advantageously overcomes the limitations and disadvantages of the conventional middleware techniques described above. A novel middleware technique described herein advantageously uses recursive algorithms to at least partially automate the creation of an inbound message structure. Thus, relatively fewer inbound message structures cover a relatively wider variety of inbound message formats. In some cases, an "on the fly" generated inbound message structure replicates an inbound message structure that, in conventional systems, would have been designed by a system analyst. In other cases, the dynamically generated outbound message structure generates a new inbound message structure and advantageously enables a parsing system to continue to parse the message, where a conventional parsing system would have generated an error and required human intervention to resolve.

Figure 1:
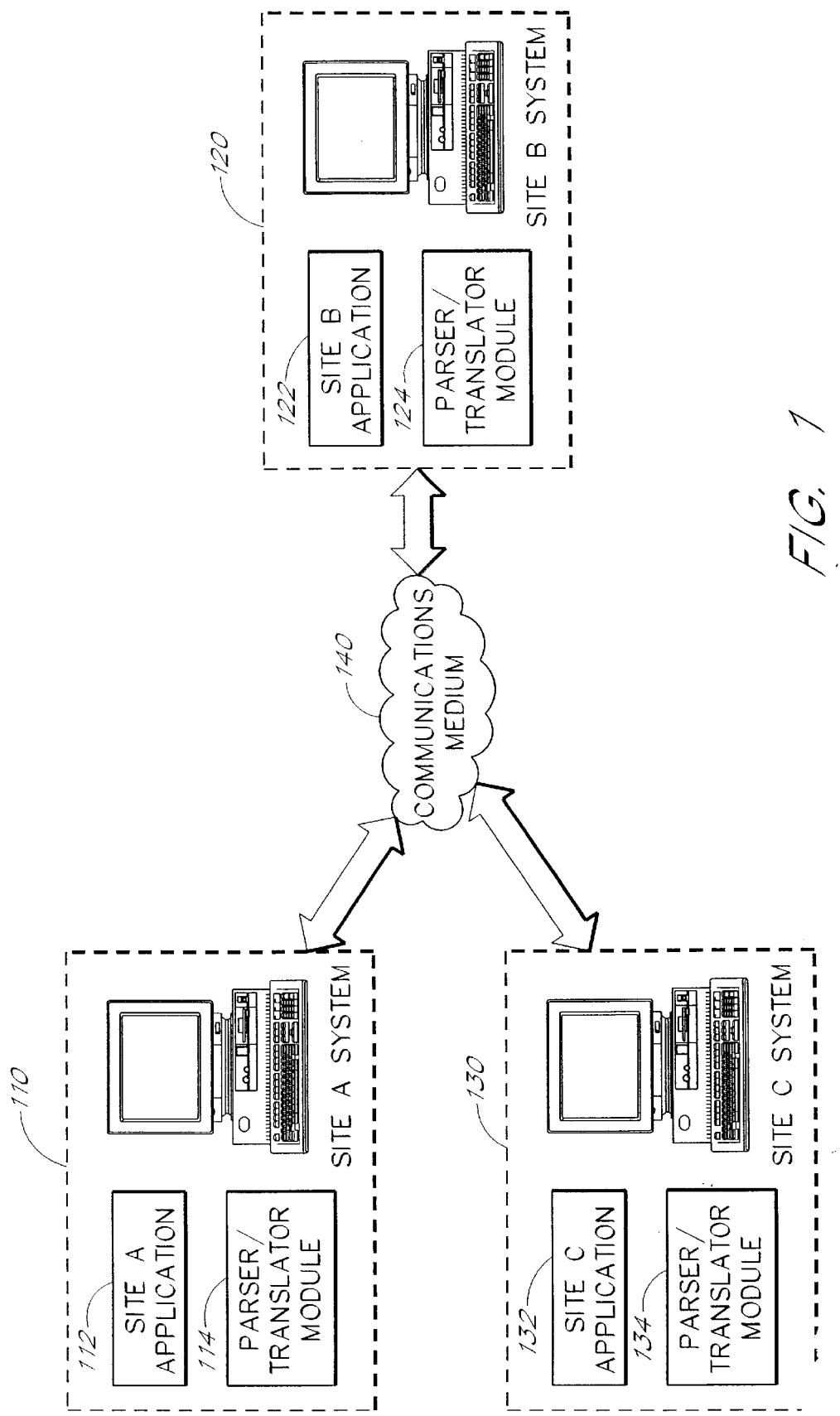
FIG. 1 illustrates a sample network of interconnected computer systems.

FIG. 1 illustrates a top-level view of a distributed network of interconnected computer systems 100. The distributed network 100 includes first, second, and third computer systems 110, 120, 130 and a communications medium 140. The first, the second, and the third computer systems 110, 120, 130 can reside in distant geographical locations and be distributed among separate entities. For example, the first computer system 110 can be located in a hospital in California and can execute a first application 112 that generates billing information. The second computer system 120 can be an insurance company system in Delaware and can execute a second application 122 that determines an amount of coverage. The third computer system 130 can be a banking system in New York and can execute a third application 124 that transfers money.

The computers communicate via the communications medium 130. The communications medium includes standard networks such as the Internet. The communications medium 130 can also include other mediums suitable for the transmission of data including internal networks and external networks, private networks and public networks, and wired, optical, and wireless networks. It will be understood by one of ordinary skill in the art that the data transferred over the communications medium 130 may also be encrypted.

Rarely do all the various computers systems, operating systems, and applications executed by multiple business partners produce compatible messages. In order to accommodate the various message formats, the computer systems 110, 120, 130 of the distributed network 100 include middleware, including first, second, and third parser/translator modules 114, 124, 134, respectively to parse and translate the messages between the computer systems 110, 120, 130 such that the computer systems can communicate intelligibly.

It will be understood by one of ordinary skill in the art that middleware can reside in a number of locations within the distributed network 100. For example, the first parser/translator module 114 can execute on a computer system separate from, but remaining in communication with, the first computer system 110. In another embodiment, messages from a computer system in the distributed network 100 can be transmitted to remote computer system connected to the distributed network 100, where the parsing and translation is performed. The message can then be directed to a recipient system.

It will also be understood by one of ordinary skill in the art that the middleware computer system can parse and translate data between multiple applications running on a single computer system, such as the first computer system 110.

Figure 2:
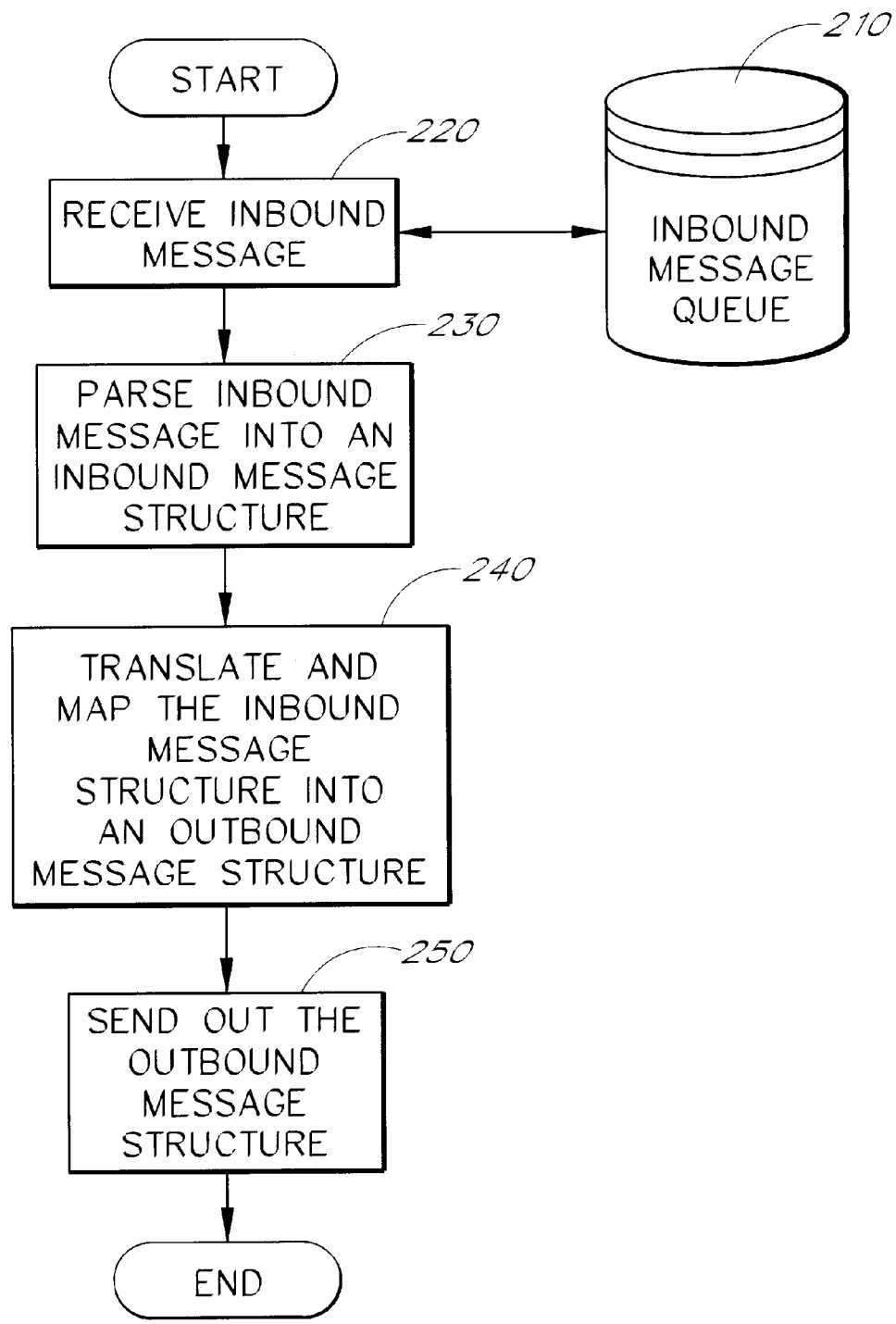
FIG. 2 illustrates a conceptual view of data flow.

FIG. 2 illustrates a conceptual view of data flow. An output from a source application is stored in a queue 210. The output from the source is termed an inbound message. The inbound message is retrieved from the queue 210 by the parser/translator in State 220. In State 230, the parser/translator parses the inbound message into an inbound message structure. State 230 will be described in further detail in connection with FIG. 5.

In State 240, the information in the inbound message structure is translated and mapped into an outbound message structure. The translation and mapping involve both locating the data in the inbound message structure in specified fields in the outbound message structure, and involves changing data as necessary. For example, the source application may generate an inbound message with a person's first name in mixed case, such as "Charles." A receiving system may require that the person's first name be in all capitals, such as "CHARLES." State 240 includes logic to make such a conversion.

If the inbound message maps into the inbound message structure correctly, the inbound message structure with content is termed a "structured event." When the message does not map correctly into the inbound message structure, an error is generated, a new inbound message structure can be selected, and the mapping process can repeat.

In State 250, the outbound message structure is sent to the receiving application. Once the message has been received by the receiving application, the receiving application can extract the desired data from the outbound message structure.

Figure 3:
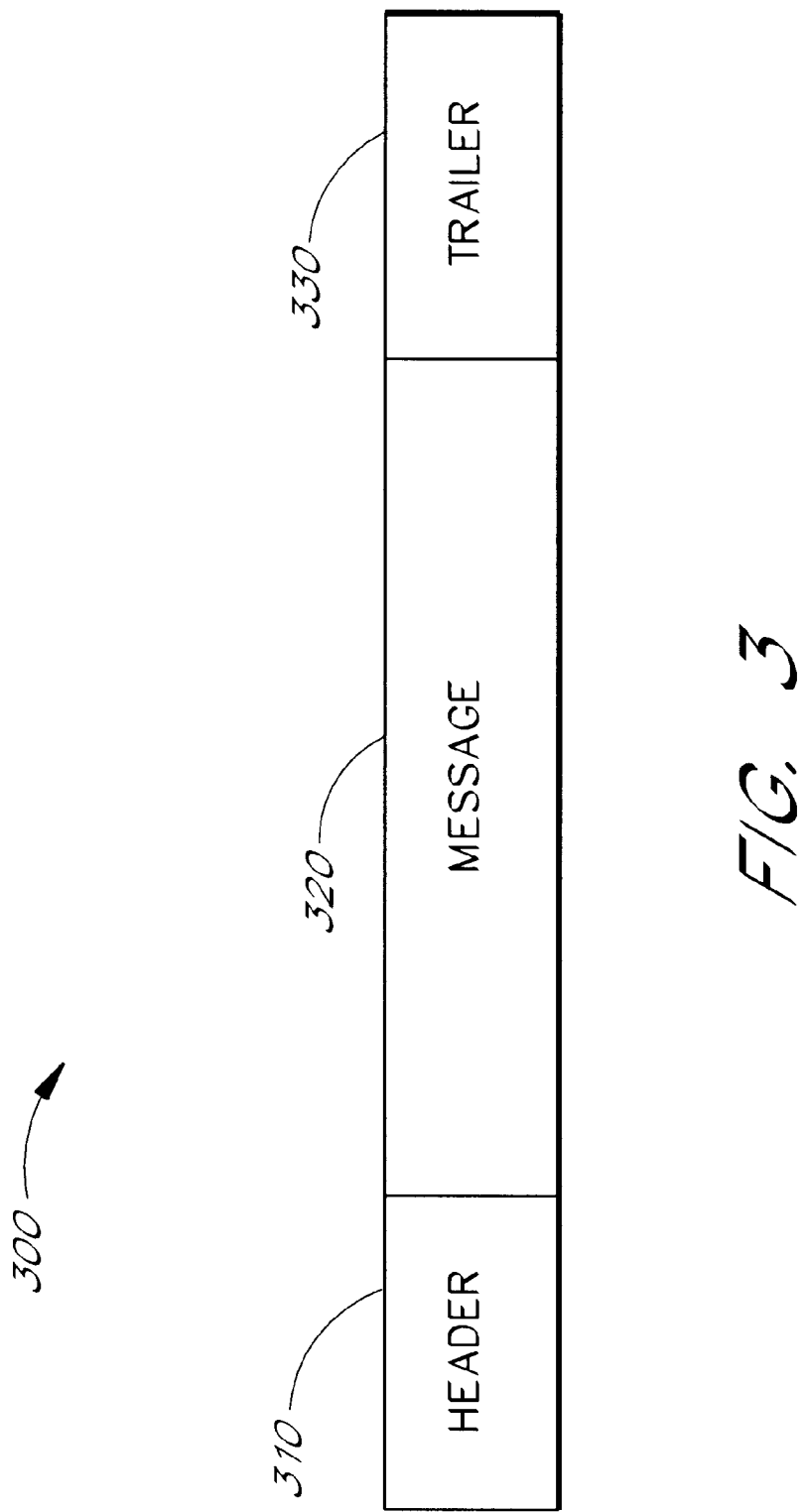
FIG. 3 illustrates a general format of an electronic message.

In order to illustrate one embodiment of the present invention to flexibly translate messages, one packet type used to transport messages will now be described. A standard method used to send data electronically between computer systems is known in the art as packet switching. A network carries data sent from one computer system to another computer system in data packets. The Internet is one such network that transfers data in data packets. Standard protocols for packet switching include TCP/IP, HTTP, FTP, and Gopher. Typically, a message is broken down into multiple smaller components, which are individually framed into data packets and sent to the receiving computer system. A packet includes its destination address in addition to the data contained therein. FIG. 3 illustrates a sample data packet 300.

The sample data packet 300 includes a header component 310, a message component 320, and a trailer component 330. The header component 310 and the trailer component 330 indicate the beginning and the end of the message component 320. The header component 310 and the trailer component 330 also identify the message component 320 to allow the receiving computer system to reconstruct the original message from multiple message components. In one example, where the source application 210, the parser/translator application 230, and the destination application 250 are remotely located in disparate computer systems, both the inbound message 220 and the outbound message 240 can be framed when sent.

Messages can conform to a fixed format, a delimited format, or a combination of the two. In the fixed format, a data element is predictably stored within a predetermined range of bytes. A system separates data in the message with reference to the location of the data. The disadvantages of fixed formats include a lack of flexibility, a maximum element size, and an inefficient use of memory because unused bytes are filled with spaces. A first text string shown below illustrates a message in the fixed format:

"POS004SALES0987654321Abe B. Christo 42555"

A second text string, below, is an example of a message in a delimited format:

"POS004~SALES~0987654321~Abe*B.*Christo~42555"

In the delimited format shown above, the delimiters used are end delimiters. A delimiter is a character or combination of characters that separates two pieces of data. Commonly used delimiters are: "~, *, ^, |, \r, &, +, :," or their digital equivalents. Of course, other characters or codes may also be used. The act of separating data is also termed "parsing." A field can have an end delimiter, a begin delimiter, or both. The end delimiter appears at the end of a field. The begin delimiter appears at the beginning of a field. Conventional hospital billing systems use an HL7 message standard, which separates fields with end delimiters. By contrast, messages that conform to HTML and XML standards feature both begin and end delimiters.

The tilde (~) and asterisk (*) characters are the end delimiters in the second text string shown above. In the example shown above, the tilde character (~) separates fields of data and the asterisk character (*) separates sub-fields of data. Thus, the content for a point of sale field, "POS004," and the content for the type of sale, "SALES," can be separated. The sub-field delimiter asterisk (*) "Abe*B.*Christo" into the subfields "Abe," "B.," and "Christo."

Figure 4A:
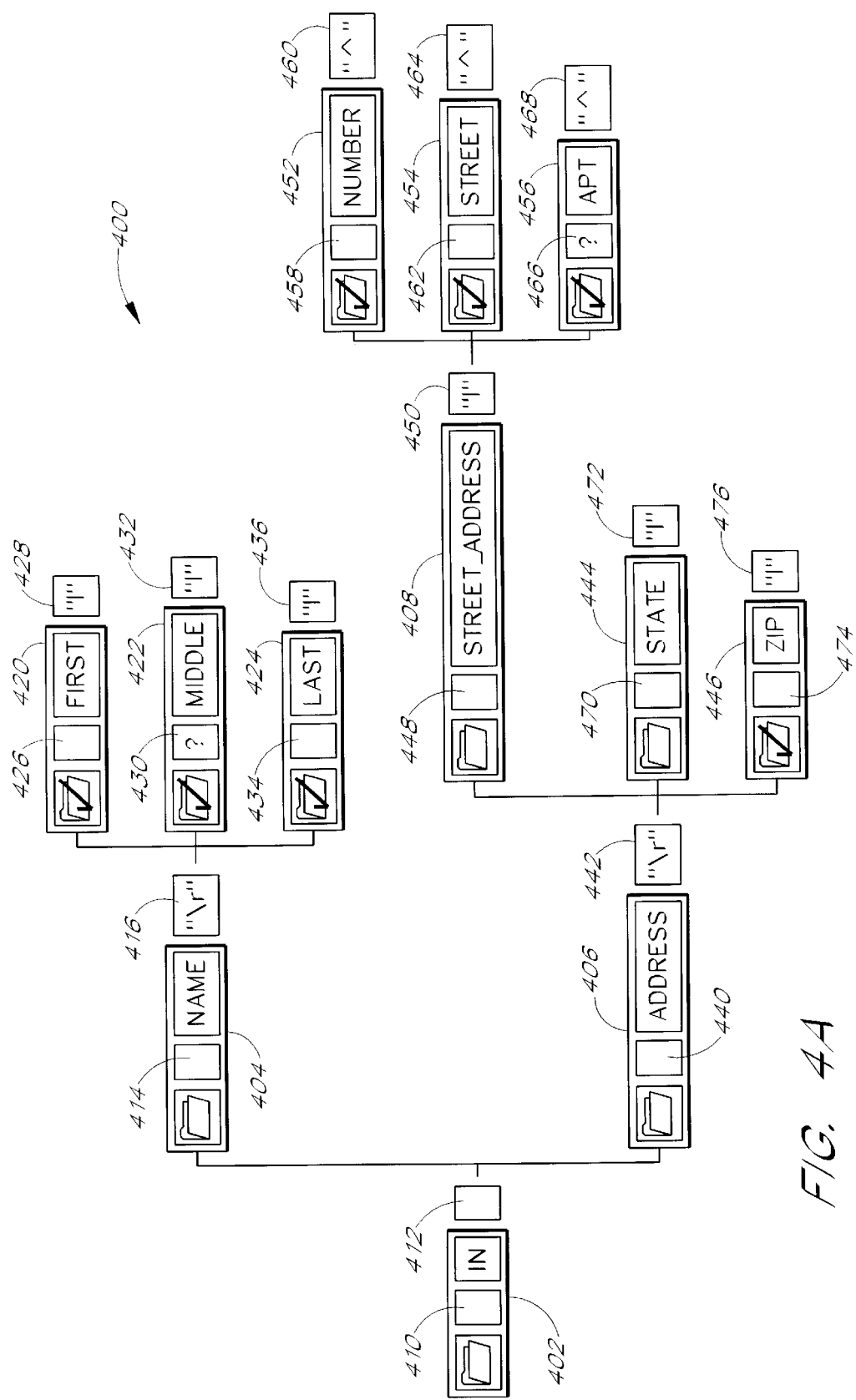
FIG. 4A illustrates end delimiters in a fixed message structure.

FIG. 4A is a simple example of a first message structure 400, which demonstrates the use of end delimiters in the form of a hierarchical tree. In one embodiment, a graphical user interface (GUI) in the form of a hierarchical tree allows a user to specify a message structure using simple drag and drop functions. Of course, the message structure can also be specified textually. The first message structure 400 flows generally from left to right and from the top to the bottom. The first message structure 400 organizes an inbound message into nodes and leaves by decoding the delimiters contained therein. Nodes are elements of the tree from which other elements branch. Leaves correspond to elements at the "bottom" of the tree, i.e., where no elements branch. In a conventional system, only the leaves of the hierarchy store data. By contrast, one embodiment of the present invention allows nodes, as well as leaves, to store data.

The nodes of the first message structure 400 include an in node 402, a name node 404, an address node 406, and a street_address node 408. In the example shown, the in node 402 is used to link the related nodes and leaves together. The in node 402 has no option selected in an option component 410, as the option component 410 is empty or left blank. As discussed later, the existence of an option is indicated by a "?" in a node or leaf's option component. In one embodiment, no option defaults to a mandatory condition, where if the rest of the tree does not contain data, the tree is indicated as invalid. The in node 402 has no end delimiter 412 specified. No delimiter is needed for the in node 402 unless multiple name/address combinations are simultaneously parsed.

Because there is no option specified in an option component 410 of the name node 404, the name node 404 is mandatory and if no data is present in a subsequent field, such as the first name leaf 420 or a last name leaf 424, the name node 404 will be indicated as invalid. The name node 404 specifies a carriage return character (designated here as "\r") as an end delimiter 416. It will be understood by one of ordinary skill in the art that though the carriage return character (\r) appears in the text here as two characters, in an actual computer system, the carriage return is typically a single 7-bit or 8-bit character. Thus, the first carriage return character encountered indicates that the end of the name node has been reached. Subsequent data parses to the next field or sub-field, which in this case is the first leaf 420. The name node 404 branches to the first name leaf 420, a middle name leaf 422, and the last name leaf 424.

The first name leaf 420 is mandatory as indicated by having no option set or specified in an option component 426. The first name leaf 420 specifies a pipe character (|) as an end delimiter. Upon reaching the pipe character (|), further data is parsed into the middle name leaf 422.

The question mark character (?) in the option component 430 of the middle name leaf 422 indicates that the middle name leaf is optional, i.e., that not people have middle names and thus, a name without a middle name will not be marked as invalid. The middle name leaf also uses the pipe character (|) as an end delimiter 432. Upon reaching the pipe character (|), further data is parsed to the last name leaf 424. The empty option component 434 defines the last name leaf 424 as mandatory. The pipe character (|) is again used as an end delimiter 436. Upon reaching the end delimiter (|) of the last name leaf 424, further data is parsed to the address node 406.

The address node 406 has no option specified in an option component 440 and is mandatory. A carriage return "\" is again defined as an end delimiter 442 for the address node 406. Thus, when the carriage return is encountered, the system stops parsing data to the address node 406 and parses data to the street_address node 408, which is a child of the address node 406. The address node 406 branches to three children. The three children are the street_address node 408, a state leaf 444, and a zip leaf 446.

In this example, the street_address node 408 is mandatory, as indicated by having no option set or specified in an option component 448, and the pipe character (|) is specified as an end delimiter 450. When the subsequent data read from inbound message corresponds to the pipe character (|), the system stops parsing to the street_address node 408 and starts parsing to a number leaf 452. The number leaf 452, a street leaf 454, and an apt leaf 456, are children of the street_address node 450.

The number leaf 452 is mandatory, as indicated by having no option set or specified in an option component 458, and specifies a caret character (^) as an end delimiter 460. Thus, the system parses data to the number leaf 452 until a caret character (^) is reached. When the caret character (^) is reached, the system parses data to the street leaf 454. The street leaf 454 is again mandatory as indicated by no option set in an option component 462. The caret character (^) again serves as an end delimiter 464 for the street leaf 454. When the next caret character (^) is reached, the system parses data to the apt leaf 456.

The question mark character (?) in the option component 466 of the apt leaf 456 again indicates that the field is optional, i.e., that not all addresses have apartment numbers and thus, an address without an apartment number will not be marked as invalid. Data, if any, is written to the apt leaf 456 until an end delimiter 468 is reached. The end delimiter 468 for the apt leaf 456 is again the caret character (^).

Subsequent data is sent to the state leaf 444 of the address node 406. The state leaf is a mandatory field as indicated by no option set in an option component 470. Data sent to the state leaf 444 is written to the state leaf 444 until an end delimiter 472 is reached. The end delimiter 472 is specified as the pipe character (|). Upon reaching the pipe character (|), subsequent data is directed to the zip leaf 446. The zip leaf 446 is again a mandatory field as indicated by the absence of an option in an option component 474. Data sent to the zip leaf 446 is written to the zip leaf 446 until an end delimiter 476 is encountered. The end delimiter specified for the zip leaf 446 is the pipe character (|)

The first message structure 400 can be selected, for example, as an inbound message structure. A third text string, below, illustrates a message string that that can be parsed into the first message structure 400 when the first message structure is used as an inbound message structure:

"\rABE|B.     |CHRISTO|\r100^MAIN STREET^4^CALIFORNIA|90000|"

Figure 4B:
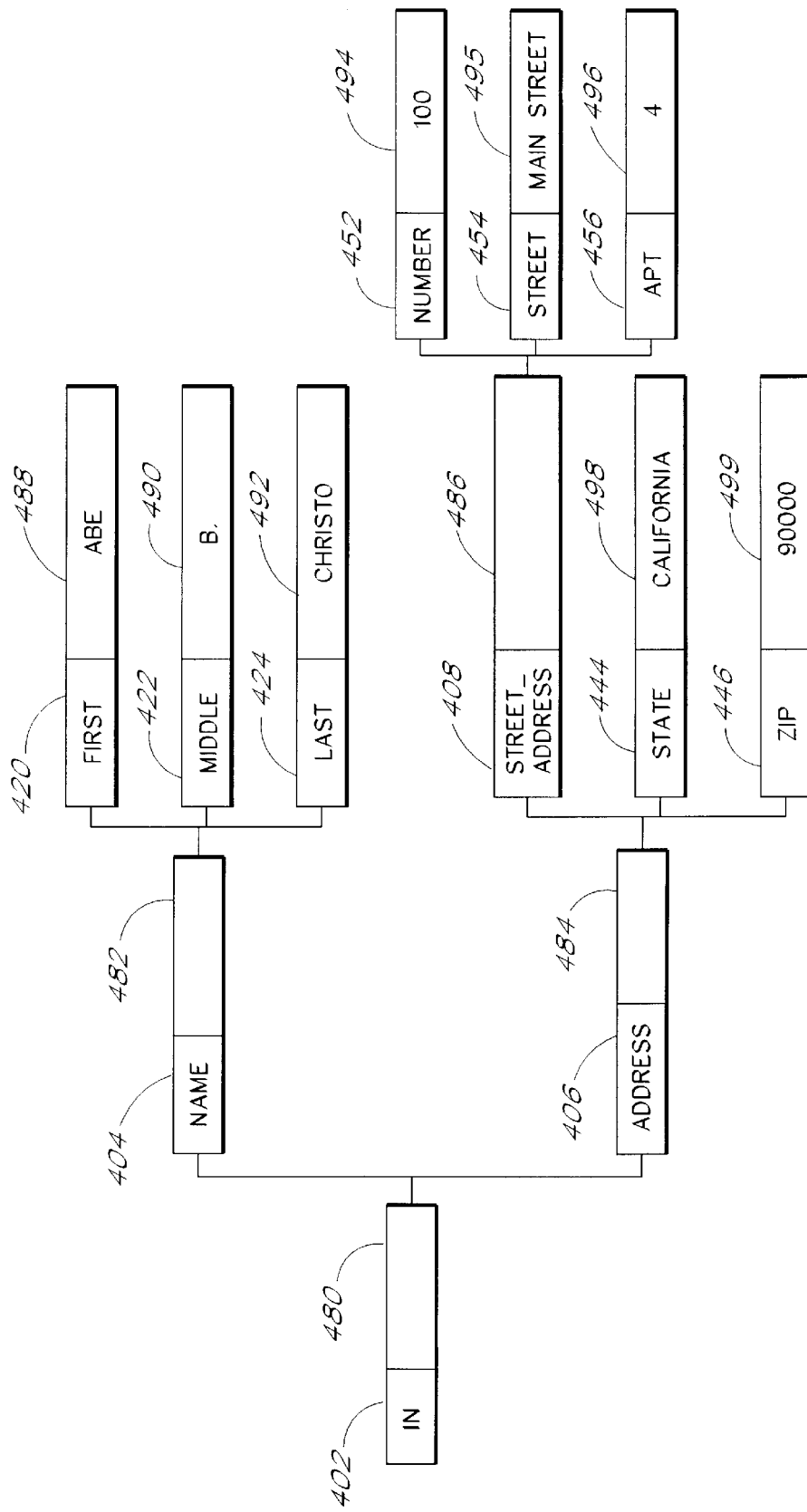
FIG. 4B illustrates the fixed message structure of FIG. 4A populated with data.

FIG. 4B illustrates the third text string as parsed into the first message structure 400. The in node 402, the name node 404, the address node 406, and the street_address node 408 contain no content as indicated by having empty content 480, 482, 484, 486, respectively. The first name leaf 420, middle name leaf 422, and last name leaf, respectively contain "ABE" 488, "B." 490, and "CHRISTO" 492. The number leaf 452, the street leaf 454, and the apt leaf 456, respectively contain "100" 494, "MAIN STREET" 495, and "4" 496. The state leaf 444 and the zip leaf 446 contain "CALIFORNIA" 498, "90000" 499, respectively.

An embodiment according to the invention that advantageously stores content in both the nodes and the leaves of a message structure, such as the first message structure 400, is described later in connection with FIGS. 11A and 11B.

Figure 5:
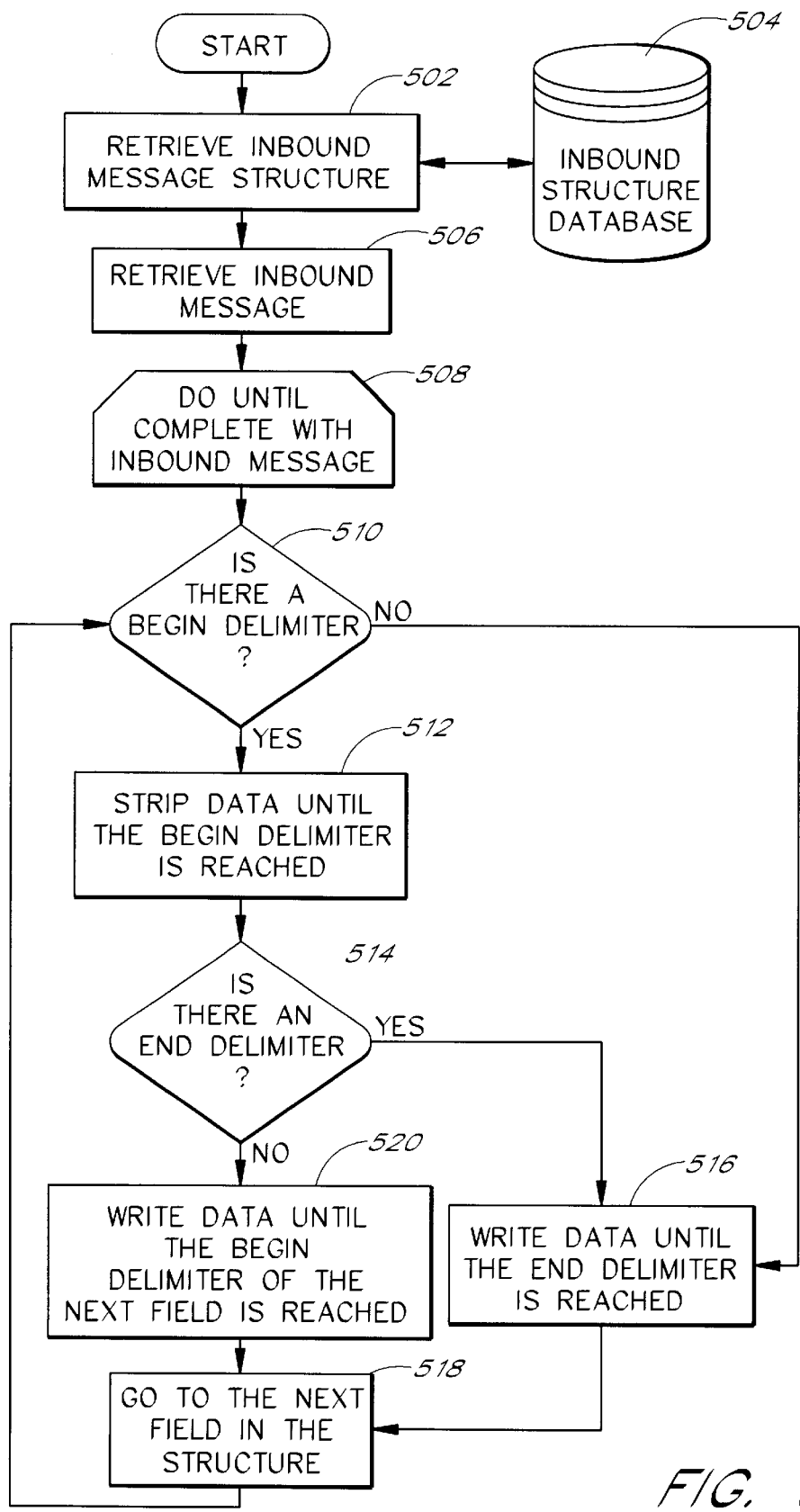
FIG. 5 is a flowchart of a process of parsing an inbound message into a fixed message structure.

A process of parsing the foregoing message string is illustrated in FIG. 5. As shown in FIG. 5, in one embodiment, each level or depth in the tree is defined in the message by a unique delimiter. It will be understood by one of ordinary skill in the art that a portion of a message can first be written to a buffer, the delimiter can then be read, and then the message can be written to a memory cell of the array as indicated by the delimiter.

FIG. 5 is a flowchart of one embodiment of a process in accordance with the present invention of parsing an inbound message into a fixed message structure. The flowchart disclosed in FIG. 5 can parse the foregoing message string into the first message structure 400.

In State 502, the process retrieves an inbound message structure from the inbound structure database 504. Initially, the first field in the inbound message structure is the current field. There can be more than one possible inbound message structure in the inbound structure database 504, in which case the process includes testing the various inbound message structures for compatibility on a trial and error basis. For example, the inbound structure database 504 can store a dozen different inbound message structures. When the message fails to parse in the selected message structure, that is, an error occurs, a next message structure can be selected. In one embodiment, the inbound structure database 504 defines only one inbound message structure. The process advances from State 502 to State 506.

In State 506, the process retrieves the inbound message. The process advances from State 506 to State 508. The inbound message will be parsed until it is exhausted as indicated by State 508. The process advances from State 508 to State 510. In State 510, the process determines whether the current field from the inbound message structure has a defined begin delimiter. If the begin delimiter is specified, the process advances from State 510 to State 512. If the begin delimiter is not specified, the process advances from State 510 to State 516.

In State 512, the data in the inbound message is stripped (thrown away) until the begin delimiter is reached. The begin delimiter can include compound characters, i.e., delimiters made of 2 or more characters. In another embodiment, an error message is generated when the inbound message does not exactly parse into the selected inbound message structure. When the begin delimiter is reached, the process advances from State 512 to State 514.

In State 514, the process determines whether the current field has an end delimiter. If the end delimiter is specified, the process advances from State 514 to State 516. If no end delimiter is specified, the process advances from State 514 to State 520.

In State 516, the data from the inbound message is written to the current field until the end delimiter is reached. The end delimiter can also include compound characters. The process advances from State 516 to State 518.

In State 518, the process retrieves the delimiters for the next field in the inbound message structure, and prepares to write subsequent data to the next field. The process returns to State 510.

In State 520, the process retrieves the begin delimiter of the next field in the inbound message structure, and continues to write retrieved data from the inbound message into the current structure until the begin delimiter of the next field is reached. The process advances from State 520 to State 518.

Once the message has been loaded into the inbound message structure, the message is mapped into an outbound message structure. As described in connection with FIG. 2, the data in the inbound message structure is selected, logically transformed, and placed into the outbound message structure.

In a conventional system, an inbound message structure is defined by a list of delimiters and a list of nodes that defines a hierarchical tree structure. The inbound message structure is rigidly defined and can only handle a message conforming to rigid requirements. Conventional systems are limited to one comparison between a message character (or group of characters) and a delimiter character (or group of characters) before declaring an indication for a match of the delimiter to the node. Disadvantageously, a node defined by one specific delimiter cannot adapt to a variety of messages.

In contrast to the conventional system described above, an embodiment of the present invention advantageously allows the user to modify the behavior of a node such that the node flexibly accommodates a relatively larger variety of delimiters encountered in messages. The modification of the behavior of the node thus permits the system to adapt to new message formats. The behavior of a node is flexibly defined by relating a user configurable modifier list to the node and defining the inbound message structure as the message parses to the inbound message structure.

Figure 6:
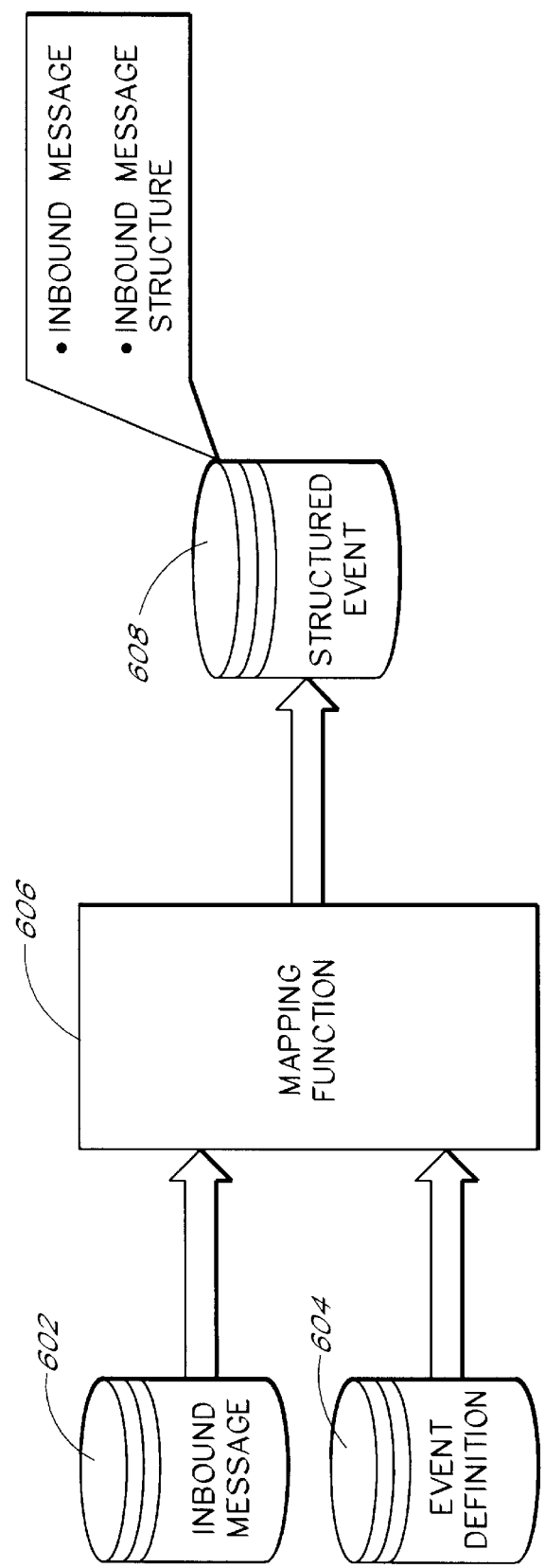
FIG. 6 illustrates an overview process of mapping from an event definition.

FIG. 6 illustrates an overview process of defining an inbound message structure while an inbound message 602 is parsed. The inbound message 602 and an event definition 604 are read by a mapping function 606. As the mapping function 606 reads the inbound message, the mapping function 606 generates an inbound message structure and parses the inbound message to the inbound message structure. When the task of creating and loading the inbound message structure is complete, the loaded inbound message structure is referred to as a structured event 608. In one embodiment, the structured event 608 is stored in random access memory (RAM) to enhance speed.

The event definition 604 includes a description of the delimiters in the message and a description of the logical structure of the inbound message 602. Each field in an inbound message structure maps to a field in the event definition 604. By contrast, each field in the event definition 604 can map to multiple fields in the inbound message structure, or even no fields in the inbound message structure (optional fields). A field in the event definition 604 contains the information necessary to create a field in the inbound message structure. Each event definition field can include an aggregate of information. This aggregate can include the type of data that is stored in the field, the type of begin and end delimiters, whether the field is optional, how often the field can repeat, etc. In one embodiment, the description of the delimiters is passed to the mapping function 606 in the form of an ordered list, where the delimiters are listed in the order of the hierarchy. The logical structure can flexibly define a variety of inbound message structures. The logical structure includes configurable nodes, which can flexibly define a variety of node types and a number of nodes by accessing a modifier list, thus permitting the generation of multiple inbound message structures.

Relating the modifier list to the node allows the user to change the behavior of an existing message structure, as well as message structures yet to be created. One can take an existing message structure and redefine the message structure by relating a modifier list to a node contained therein. The ability to preserve the structure of a known message structure and yet change the message structure's behavior during parsing can advantageously permit the re-use of existing logic for mapping and translation, resulting in significant savings in the amount of manual labor and time needed to define a message structure. In one embodiment, the behavior of the node can be modified such that, for example, a node originally defined only to parse with a single character end delimiter can flexibly parse compound begin and end delimiters such as HTML and XML tags.

Figure 7:
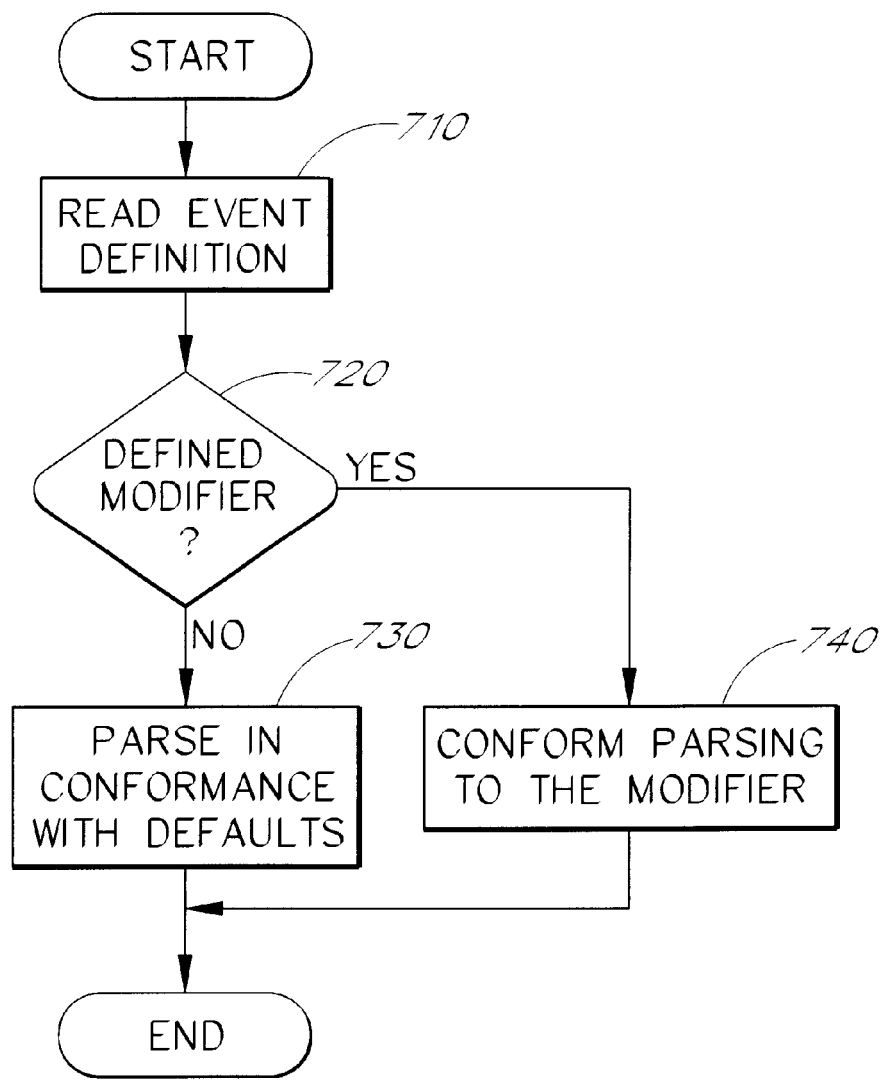
FIG. 7 is a flowchart of a process of parsing with a modifier.

FIG. 7 is a flowchart of a process of parsing with a modifier. In State 710, the mapping function 606 reads the event definition 604. In State 720, the mapping function 606 determines whether the relevant node corresponds to a modifier list. If there is no corresponding modifier list, the process advances to State 730 and the mapping function uses a default definition for the node. For example, in an HL7 structure, the default delimiters are carriage return (\r), pipe (|), caret (^), ampersand (&), and tilde (~), respectively, for the segment, field, sub-field, sub-sub-field, and repetition for field.

The process advances to State 740 when the node corresponds to a modifier in the modifier list and the mapping function 606 parses the inbound message in conformity with the modifier. An entry in the modifier list describes the nature of the modifier and a specification for the modification. In one embodiment, each modifier corresponds to a subroutine call and the specification for the modifier is passed to the subroutine as a parameter. Table 1, below, illustrates a non-exhaustive list of several modifiers with sample specifications:

TABLE I

| Modifier Name | Modifier | Sample Specification |
| --- | --- | --- |
| begin delimiter | Bd | caret character (^) |
| end delimiter | Ed | asterisk (*) |
| group repetition | Gr | 0 to infinity, field list |
| not tagged | Nt | <name> |
| scavenger | Sc | whitespace characters |
| array repetition | Ri | 0 to infinity |

Exemplary characteristics of the modifiers illustrated in Table I will now be described. A begin delimiter modifier (Bd) changes the begin delimiter defined for the node. The default delimiter can specify a particular delimiter or no delimiter for the begin delimiter, but once modified, the mapping behaves as though the node were originally specified with the begin delimiter as specified by the modifier. Similarly, an end delimiter modifier (Ed) changes the end delimiter defined for the node, and the mapping occurs as if the node were originally specified with the end delimiter as specified by the modifier.

A group repetition modifier (Gr) associates a group of nodes at a level in the hierarchy and allows the modifier list to define how many times the group of nodes repeats in inbound message structure. In one embodiment, the number of times that the group of nodes repeats is a variable that can range from 0 (none, an optional group) to infinity (within memory limits) and can also define ranges.

A not tagged modifier (Nt) compares the content of a message field with a defined string. The string can conform to multiple strings. If a content of the message field corresponds to the defined string, the map of the data into the node fails. The not tagged modifier is useful when a user knows of certain data that the user does not want mapped into the inbound data structure.

A scavenger modifier (Sc) compares the contents of a message field with a string of designated characters. The portions of the message field that match with characters in the string do not map into the inbound structure. For example, the string can define whitespace characters, such as spaces and tabs, such that whitespace does not parse into the inbound message structure.

An array repetition modifier (Ri) is similar to the group repetition (Gr) modifier. The array repetition modifier allows the user to specify how many times the node can repeat in the inbound message structure. Thus, for example, an inbound message structure with 100 repeating nodes can be advantageously defined in the event definition as one node that repeats 100 times, which saves valuable memory. In one embodiment, the array repetition modifier can define a variable that can range from 0 (none, an optional node) to infinity (within memory limits) and can also define ranges.

The structured event 608 can be realized using a variety of addressable storage mediums. In one embodiment, the structured event 608 is maintained solely in RAM. One organizing scheme for identifying the nodes and the data maintained in the structured event 608 is a multi-dimensional array. The multi-dimensional array is a common data type in a number of programming languages, including Monk from Software Technologies Corporation and a ubiquitous programming language known as "C." In one embodiment, the size of the array for the inbound message structure is dynamically generated as the inbound message is mapped. The size of the array is dynamically generated because the size may vary in accordance with the content of the inbound message.

In one embodiment, the memory for the structured event is managed by a one-dimensional array (a list) of pointers. Each pointer in the list indicates a field of the structured event 608. In one example, when the event definition defines repetitions, a pointer can point to the start of 5 repeated fields of the structure. When the fifth repeated field is reached, the underlying memory can be extended by addition of another pointer. The ordering of the pointers in the list further servers to arrange the sequence of the fields of the structure.

With the multi-dimensional array, each level in the inbound message structure hierarchy corresponds to a dimension in the array. Thus, an inbound message structure with 3 levels would correspond to a 3-dimensional array. A node within the array can be accessed by reference to the node's "coordinates" or address within the array.

Figure 8:
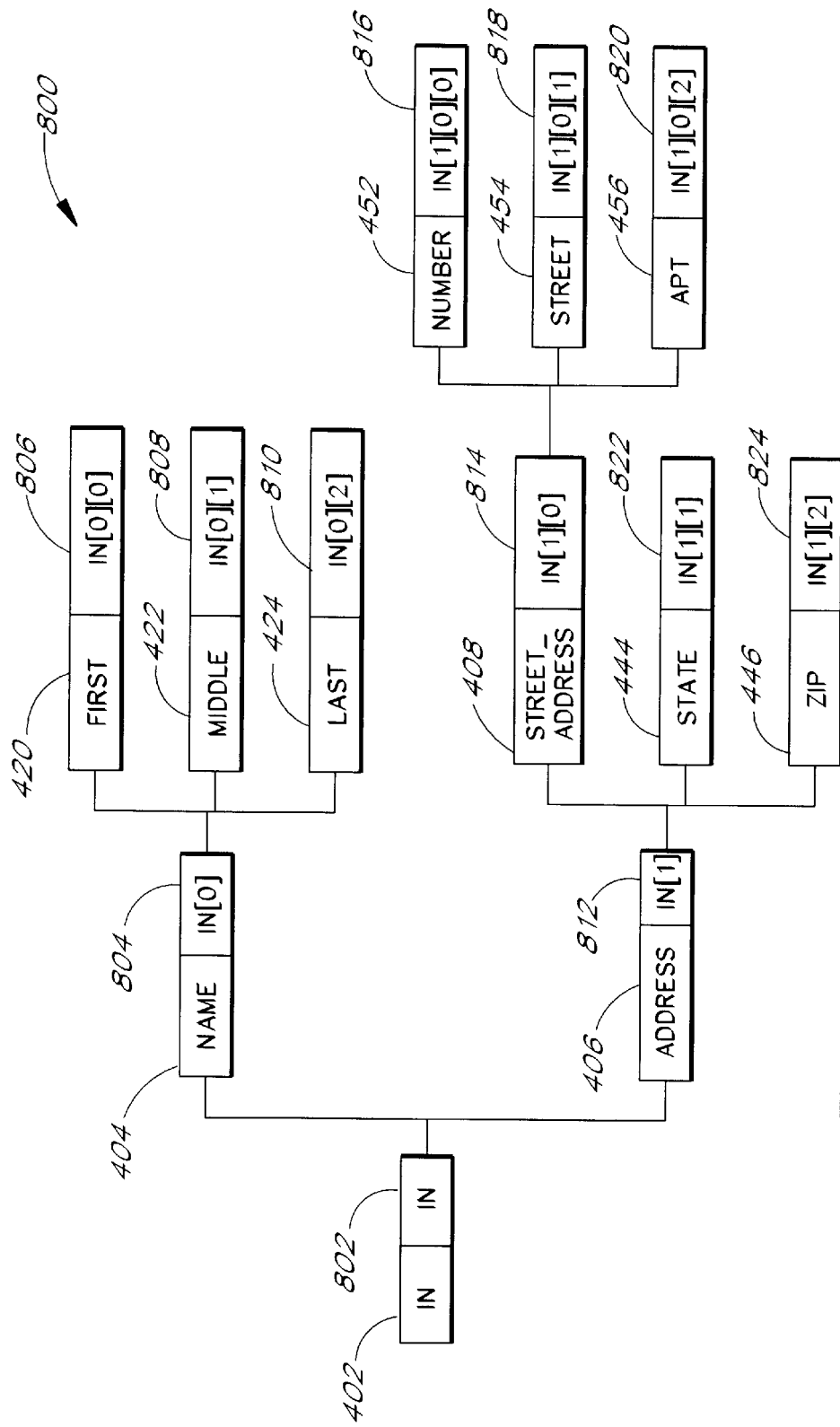
FIG. 8 illustrates a hierarchical tree with array coordinates.

FIG. 8 illustrates a hierarchical tree 800 with array addresses mapped therein. The hierarchical tree 800 of FIG. 8 follows the format of the first message structure 400 of FIG. 4A. The in node 402 contains the entire array, as indicated by in 802. The name node 404 contains the in[0] 804 dimension of the array. The first name leaf 420, the middle name leaf 422, and the last name leaf 424 are respectively specified by the array addresses in[0][0] 806, in[0][1] 808, and in[0][2] 810.

The address node 406 contains the in[1] 812 dimension of the array. The street_address node 408 contains the in[1][0] 814 dimension of the array. The number leaf 452, the street leaf 454, and the apt leaf 456 are specified by the array addresses in[1][0][0] 816, in [1][0][1] 818, and in[1][0][2] 820, respectively. The state leaf 444 and the zip leaf 446 are respectively specified by the array address in[1][1] and in[1][2].

It will be understood by one of ordinary skill in the art that after the inbound message 602 has been transformed to the structured event 608 and sent to the recipient of the message, the RAM occupied by the structured event 608 can be cleared so that the system can reuse the memory locations previously occupied. In one embodiment, the event definition 604 is retained in RAM and not cleared when the structured event 608 is cleared. The event definition 604 can remain in RAM longer than the structured event 608 because the event definition 604 defines repetitions rather than implementing repetitions and as a result, can be much more compact to store than the structured event 608.

One embodiment further allows selective parsing of an inbound message stream. Interconnected computer systems often send large messages to each other. Situations arise where a transmitted message is relatively large, and yet has not changed substantially from a previously sent message. In conventional systems, the entire inbound message stream is re-parsed and sent to the receiving system. Re-parsing the entire inbound message stream can consume valuable memory space and CPU cycles.

By selective parsing of an inbound message stream, an embodiment further adapted to update an existing structured event can advantageously avoid wasting valuable memory space and CPU cycles. A method of updating an existing structured event is described in greater detail later in connection with FIG. 10.

In one embodiment, a fixed tag can be defined in relation to a node of an inbound message structure or to a node of an event definition. The fixed tag maintains a byte count, which can be used as a pointer to indicate the start of the field in the inbound message. Thus, the inbound message combines attributes of both a fixed format and a delimited format.

In another embodiment, the system administrator of the inbound message can define the message such that certain strategic fields in the message are set at fixed byte locations (fixed format). The nodes in the event definition corresponding to the strategic fields maintain fixed tags. The fixed tags then indicate the location in the message stream that corresponds to the fields. Thus, the portion of the inbound message stream, from which to start mapping, can be identified and accessed immediately without parsing the entire inbound message stream to locate the fields.

One embodiment of the present invention allows the data for the structured event 608 to be stored in both nodes and leaves. In a conventional system, the data is stored only in the leaves of the hierarchical structure. Although storage only in the leaves of a structure provides the benefits of simplicity, a disadvantage is that the user accessing the data may not know the exact location of the leaf containing the desired data. Searching the structured event can thus take a frustratingly high number of accesses to retrieve the desired data.

Figure 9:
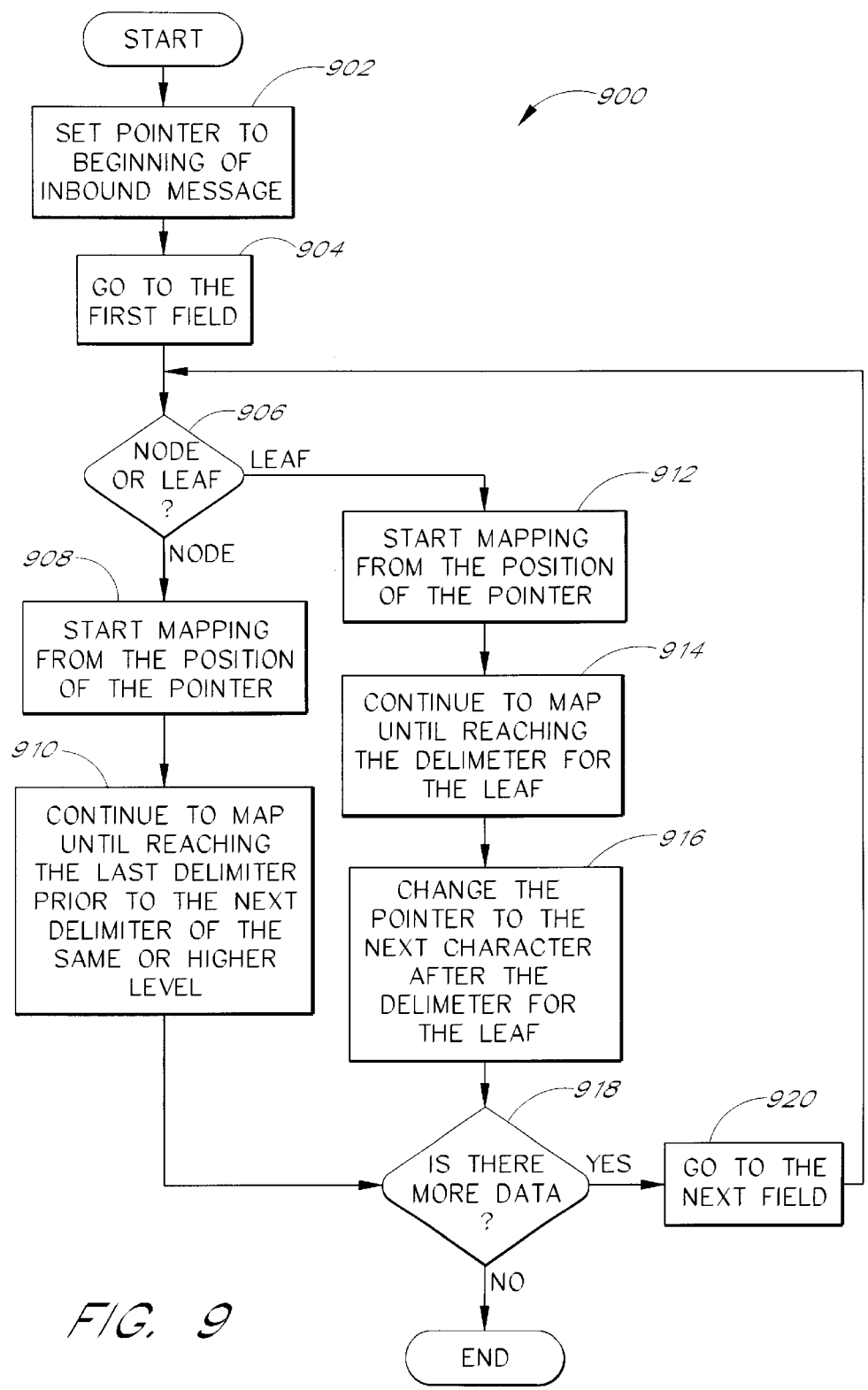
FIG. 9 is a flowchart of a process of storing an inbound message into both nodes and the leaves of the message.

As described in connection with FIG. 6, in one embodiment, the method defines one delimiter per level in the hierarchical message structure. FIG. 9 is a flowchart 900 of a process of storing the inbound message into both the nodes of the message and the leaves of the message. The process uses the hierarchical delimiter structure to navigate inside the data structure. The process may be advantageously combined with, for example, the scavenger modifier described in connection with Table I, such that a user retrieving a long string in a node can eliminate undesired whitespace characters.

In State 902, the process sets a pointer to the start of the inbound message. In State 904, the process prepares to enter data into the first field of the inbound message structure by designating the first field as the current field. In State 906, the process determines whether the current field of the inbound message structure is a node or a leaf. If the current field is a node, the process advances from State 906 to State 908. If the current field is a leaf, the process advances from State 906 to State 912.

In State 908, the process starts to map the data from the inbound message to the current node. The mapping starts from the first location indicated by the pointer and continues, as indicated by State 910, until the last delimiter that precedes another field delimiter that signifies a node equal to or higher in level than that of the current node.

In State 912, the process starts to map the data from the inbound message to the current leaf. The mapping starts from the first location indicated by the pointer. The process continues to map data from the inbound message, as indicated by State 914, until the delimiter for the leaf has been reached. In State 916, the delimiter for the leaf has been reached and the pointer changes to indicate the byte or character following the position of the delimiter.

In State 918, the process determines whether the inbound message has been fully parsed. The process advances from State 918 to State 920 if the inbound message has not been fully parsed. In State 920, the process prepares to enter data into the next field of the inbound message structure. The process is complete when the inbound message has been fully mapped into the inbound message structure.

The data that is maintained in the leaf is also maintained in the parent node to that leaf, and so on. Thus, the user need not know the exact location of the leaf containing the desired data, but rather, the user only needs to know the path. Storage in both the nodes and the leaves of a structure advantageously allows a user to locate data faster than in a conventional structure, where the data is stored only in the leaves. Of course, the less precisely the path for the node is specified, the more expansive is the data in the node.

Maintaining duplicate copies of data in the nodes of message structures substantially increases the difficulty of updating the message structure with new information. The problem is exacerbated when combined with definable structures that conform dimensionally in response to the inbound message or inbound message update.

Figure 10:
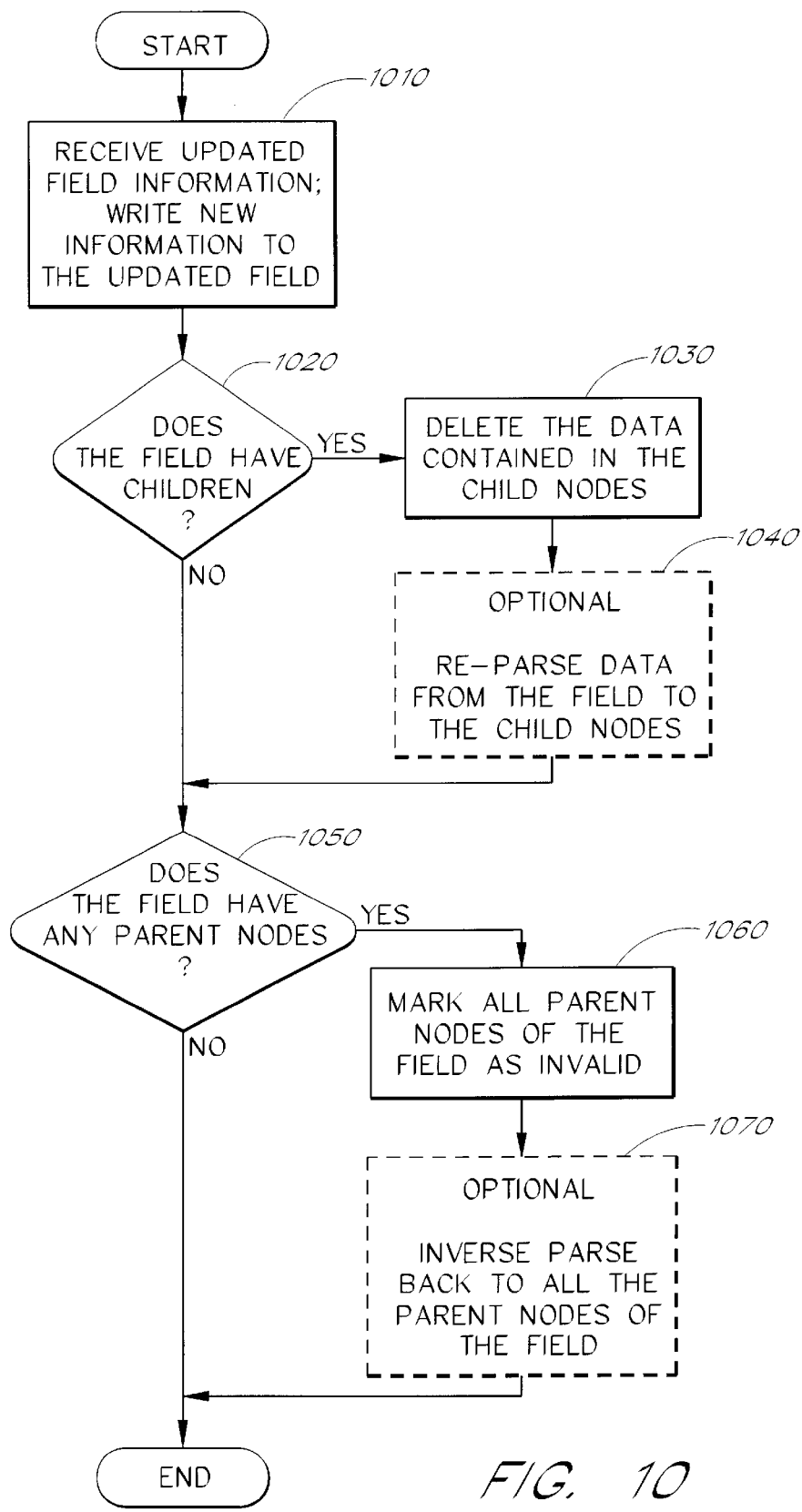
FIG. 10 is a flowchart of a process that updates an existing message structure with new information.

FIG. 10 is a flowchart of a process that updates an existing message structure with new information. In State 1010, the process receives an update for an existing field and writes the updated data to the field. In State 1020, the process determines whether the field has children (nodes or leafs lower in the hierarchy). If the field has children, the Process advances from State 1020 to State 1030, and optionally from State 1030 to State 1040. If the field does not have children, the Process advances from State 1020 to State 1050.

In State 1030, the process deletes the data contained within the child nodes of the updated field. For example, allow the street_address node 408 of FIGS. 4 and 8 to be updated with a fourth text string:

"123^Hill Street^10^"

Then, the contents of the number leaf 452, the street leaf 454, and the apt leaf 456 are deleted. The process can identify the child nodes and the child leaves of the updated field by reference to the memory array of the updated field. For example, the street_address node 408 corresponds to the in[1][0] 814 dimension of the array. The children of the street_address node 408 are the nodes and leaves that share the in[1][0] 814 dimension of the street address node 408. These nodes are indicated by the array addresses of in[1][0][0] 816, in[1][0][1] 818, and in[1][0][2] 820, which respectively correspond to the number leaf 452, the street leaf 454, and the apt leaf 456. In one embodiment, the contents of the child nodes are not entirely deleted but rather, a special character is written to the child node that indicates that the data in the child node can be treated as deleted. The process optionally advances from State 1030 to State 1040. Otherwise, the process advances from State 1030 to State 1050.

In State 1040, the process re-parses the data within the updated node to the updated node's child nodes. The process can occur as described in connection with FIG. 9, where the first field of FIG. 9 is the updated node. If the optional State 1040 is not performed, one embodiment parses the data into the child nodes from a parent node when the child node is queried or otherwise accessed.

In State 1050, the process determines whether the updated field has a parent node, i.e., the updated field is the child of another node. If the updated field has a parent node, the process advances from State 1050 to State 1060, and then optionally to State 1070. If the updated field has no parent node, then the process is complete.

In State 1060, the process provides an indication that the contents of all the parent nodes of the updated field are invalid. For example, when the street_address node 454 is updated, the address node 406 and the in node 402 are indicated as invalid. The nodes that correspond to parent nodes of the updated field can be identified by reference to the more general array addresses that still encompass the updated field. In the example, the more general array addresses of in[1] 812 and in 806, which respectively correspond to the address node 406 and the in node 402, are the more general array address that encompass the address of in[1][0] 814. In one embodiment, the process provides the indication by writing a special character to the first position of the field that defines the node. The process optionally advances from State 1060 to State 1070.

In State 1070, the process performs an inverse parsing operation. The parent nodes that were identified in State 1060 as invalid are re-populated with data from their child nodes. The inverse parsing operation occurs from relatively lower in the hierarchy to relatively higher in the hierarchy, e.g., the address node 406 is updated prior to the in node 402. In this embodiment, since nodes contain the contents of their children, the children nodes of an empty parent node contain all the content that is inverse parsed to the parent node. For example, the content of the address node 406 is inverse parsed with the contents of the address node's 406 children, which are the street address node 408, the state leaf 444, and the zip leaf 446. The identification of the children of the street_address node 408 can occur by the sub-process described in connection with State 1030. The contents of the children nodes are extracted from the hierarchy in the order indicated by the array, assembled with the delimiters for the node and loaded into the parent node. After completion of State 1070, the process is complete.

If the optional State 1070 is not performed, one embodiment populates a parent node with content derived from the parent node's child nodes when the parent node is queried or otherwise accessed.

Figure 11A:
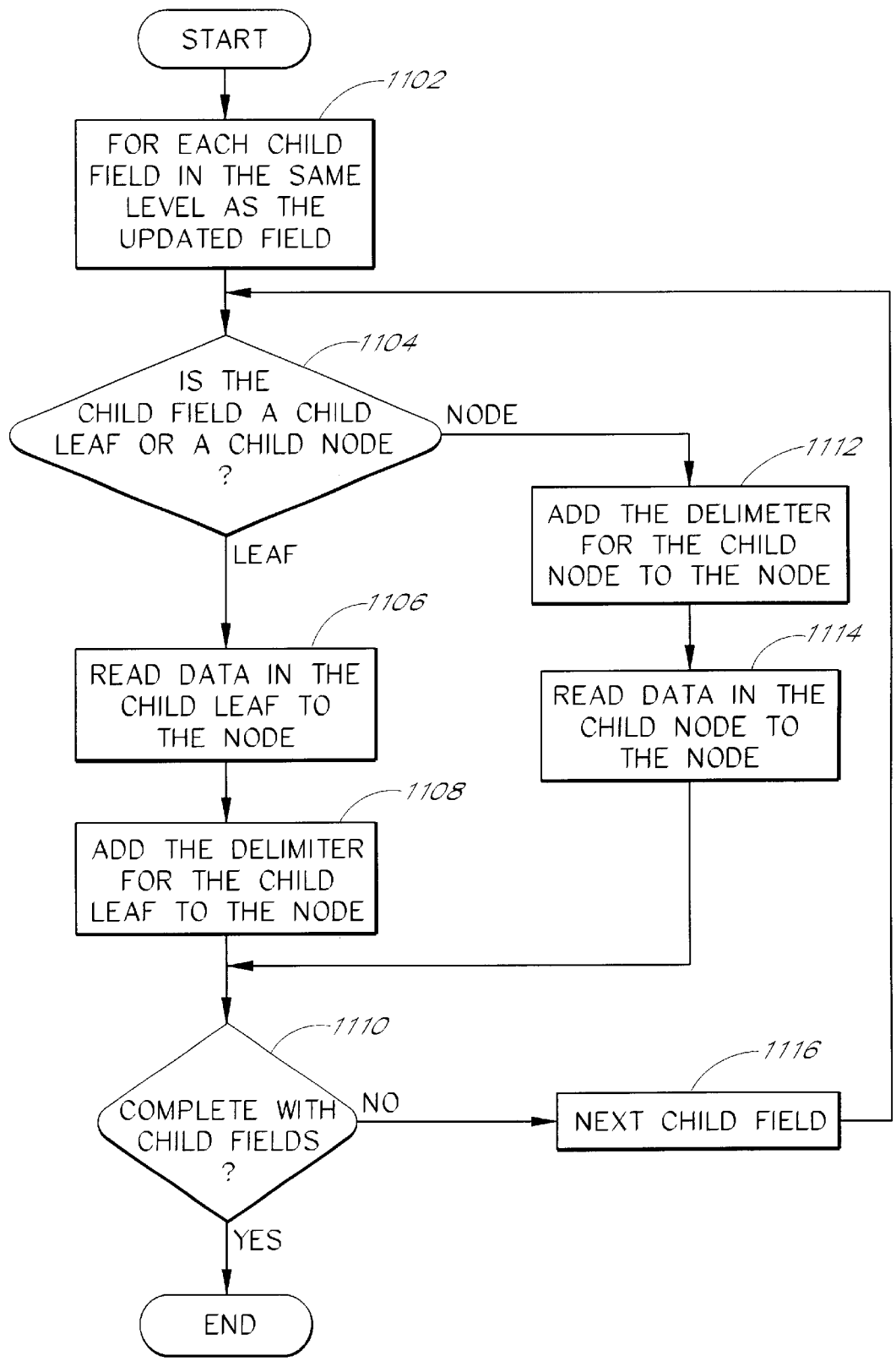
FIG. 11A is a flowchart of a process that populates a parent node with the content of the parent node's children.

FIG. 11A is a flowchart of a process that populates a parent node with the content of the parent node's children. The process repeats for all of the nodes of the hierarchy that need to be updated, starting from the lowest node in the hierarchy that needs updating and finishing with the highest node whose hierarchical tree contains updated content. To update a parent node, each child field of the parent node is examined as indicated in State 1102, i.e., the process reads the contents of the updated field and the contents of all the siblings of the updated field. In one embodiment, the children of the parent node are examined in the sequence indicated by their position in the array.

In State 1104, the process determines whether the child field is a child leaf or a child node. The process advances from State 1104 to State 1106 if the child field is a child leaf. If the child field is a child node, the process advances from State 1104 to State 1112.

In State 1106, the process reads the contents of the child leaf and appends the contents of the child leaf to the parent node. Of course, if the child leaf is the first child node read into the parent node, then the contents of the child leaf are the contents of the parent node. The process advances from State 1106 to State 1108. In State 1108, the process appends the delimiter defined for the level corresponding to the child leaf to the contents of the parent node. The process advances from State 1108 to State 1110.

In State 1112, the process appends the delimiter defined for the level corresponding to the child node to the existing contents of the parent node. If the child node is the first child field read by the process, then the delimiter is the first content of the parent node, i.e., not appended as there is nothing to append to. The process advances from State 1112 to State 1114. In State 1114, the process reads the contents of the child node and appends the contents to the parent node. The process advances from State 1114 to State 1110.

In State 1110, the process determines whether there are more child fields to examine. The process advances from State 1110 to State 1116 when there are more child fields to process. In State 1116, the process selects the next child field and returns to State 1104. The process is complete when there are no other child fields to examine, and the parent node has been completely updated. Of course, the overall process can be repeated many times to update other related nodes farther up in the hierarchy, e.g., grandparent nodes, great-grandparent nodes, etc.

The first message structure 400 shown in FIG. 11B is the identical hierarchical arrangement of nodes and leaves described in connection with FIGS. 4A and 4B. There, however, the first message structure 400 could only store data in leaves. Here, however, the process described in connection with FIG. 11A advantageously allows the message structure 400 to store content in both the nodes and leaves of the message structure 400.

FIG. 11B illustrates the third text string, repeated below, as parsed into the first message structure 400 by the process described in connection with FIG. 11A:

"\rABE|B.|CHRISTO|\r|100^MAIN STREET ^4^CALIFORNIA|90000"

The in node 402, the name node 404, the address node 406, and the street_address node 408 are now populated with "\rABE|B.|CHRISTO|\r|100^MAIN STREET^4^CALIFORNIA|90000|"1150, "ABE|B.|CHRISTO|"1152, "100^MAIN STREET^4^CALIFORNIA|90000|"1154, and "100^MAIN STREET^4^" 1156, respectively. The leaf nodes are populated with the same content seen in FIG. 4B. The first name leaf 420, middle name leaf 422, and last name leaf, again contain "ABE" 1160, "B." 1162, and "CHRISTO" 1164, respectively. The number leaf 452, the street leaf 454, and the apt leaf 456, contain "100" 1166, "MAIN STREET" 1168, and "4" 1170, respectively. The state leaf 444 and the zip leaf 446 contain "CALIFORNIA" 1172, "90000" 1174, respectively.

In one embodiment, node types are assigned to optional nodes. The node types can be used to reduce the number of output nodes generated, thus advantageously decreasing the number nodes queried when creating an output structure.

A node type of a node is initially determined when an event definition is created. After the event definition has been created, the parent-child relations of the node as well as the sibling-sibling relations can alter the node type.

Nodes can generally be classified into four node types based on whether the node is required and/or tagged. Table II, below, illustrates the four categories as initially determined when the event definition is created:

TABLE II

| Required? | Tagged? | Node Type | Node Type Name |
|---|---|---|---|
| Yes | Yes | SU | Strongly Unique |
| Yes | No | RNU | Required, Non-Unique |
| No | Yes | WU | Weakly Unique |
| No | No | NU | Non-Unique |

A node is required when the node is defined by a non-zero minimum number of repetitions. A node is tagged when the node corresponds to a string that is later compared with the contents of the node to determine validity of parsing.

The parent-child relationship of a node can change the node type of the node. A NU-parent node is promoted from N M-type to WU-type when the parent node branches to an SU-type child node. Sibling relationships of a node can also change the node type of the node. A NU-type node is promoted from NU-type to RNU-type when a sibling node immediately subsequent to the NU-type node, is of an SU-type node.

Data parsing into the structured event can also affect whether an output node will be generated. In one embodiment, an output node is generated only for SU-type nodes, RNU-type nodes, and NU-type nodes that have data content in a subsequent sibling node to the NU-type node. Output nodes are not generated for WU-type nodes and NU-type nodes that do not have data content in a subsequent sibling node.

Figure 12:
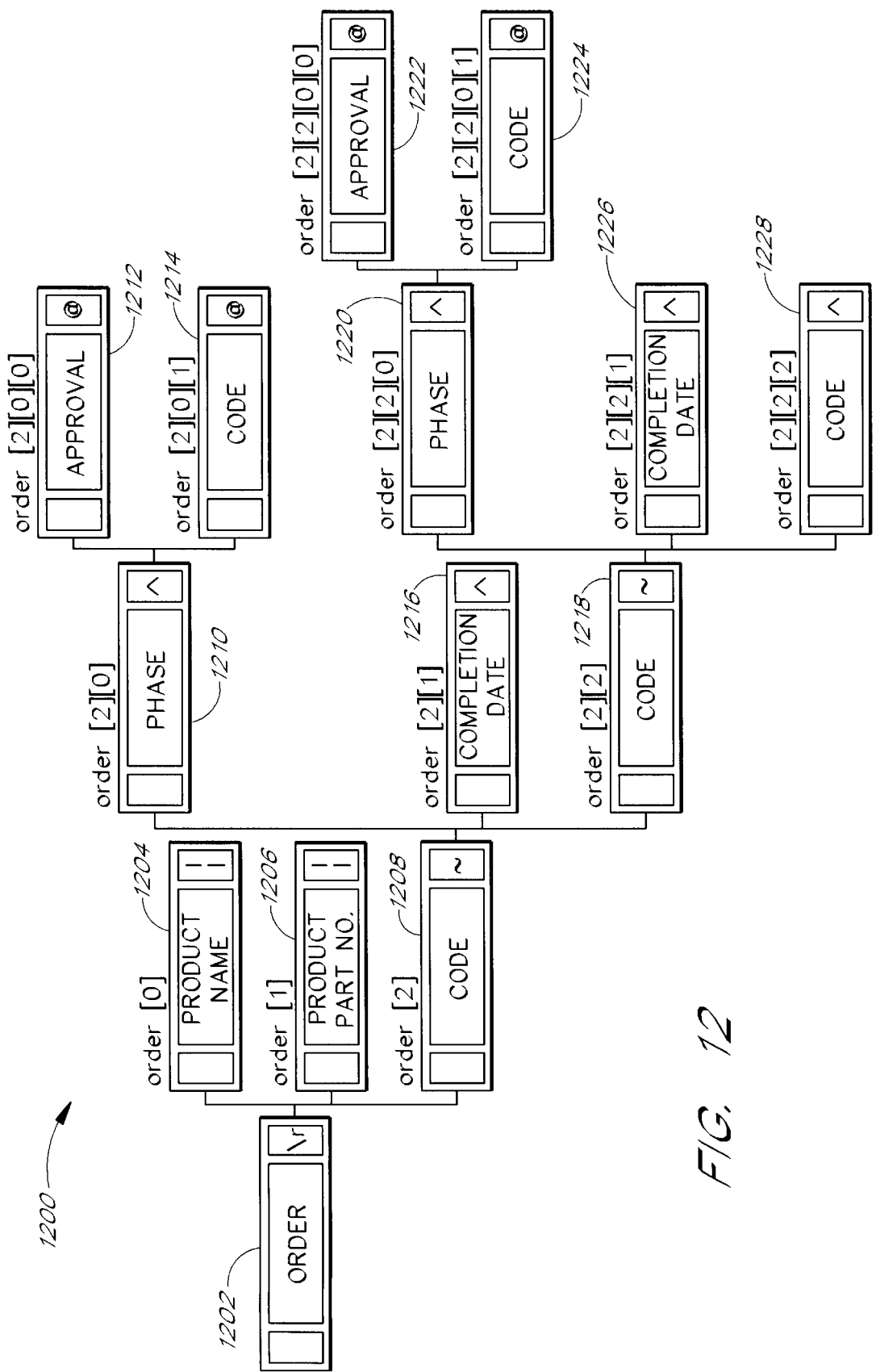
FIGS. 12 and 13 illustrate sample message structures.
Figure 13:
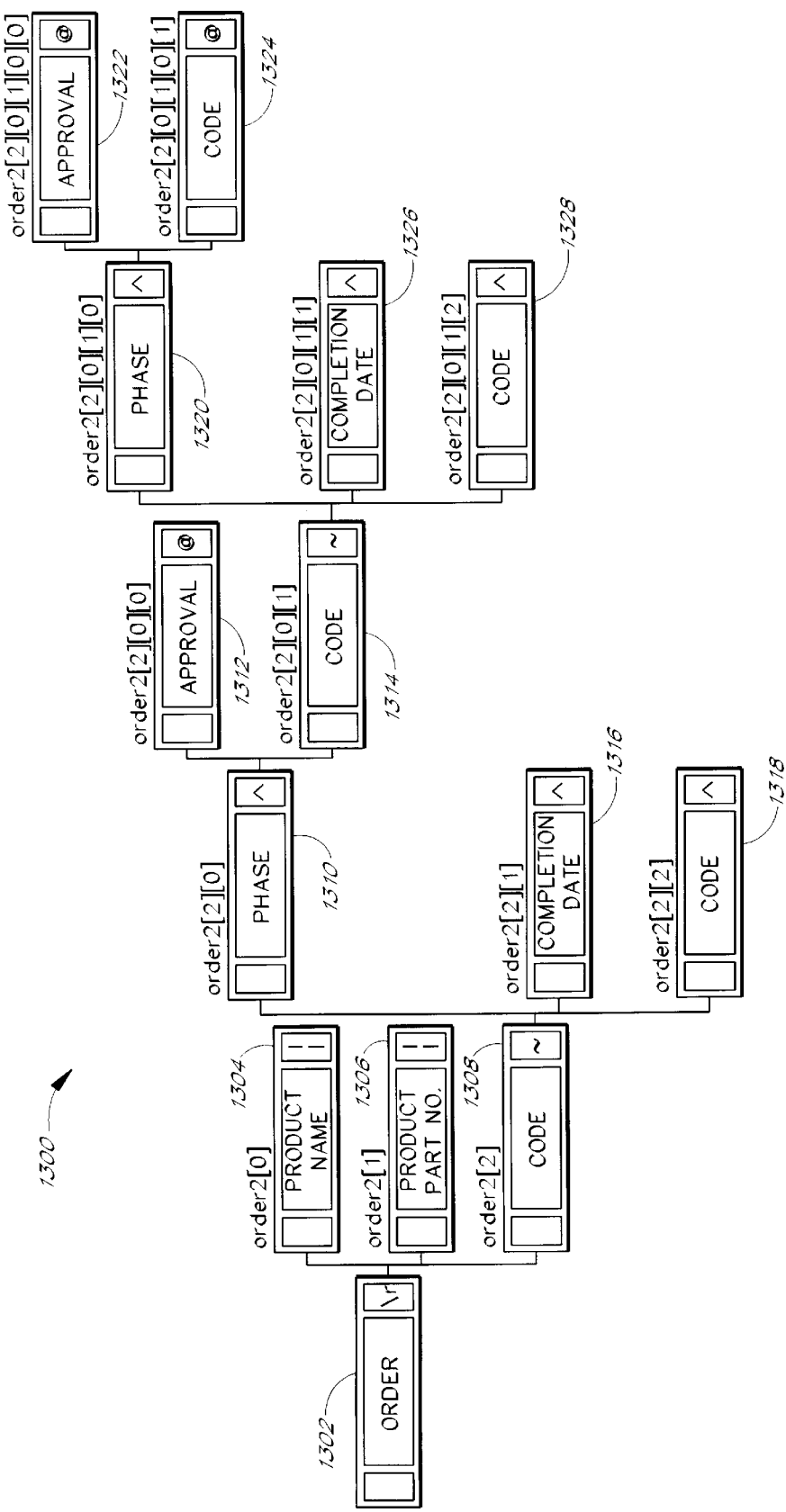

FIGS. 12 and 13 illustrate further examples of a second and a third message structure 1200, 1300. In a conventional system with fixed message structures, each message structure can only parse an inbound message with a matching format. Where there are multiple message structures and the message is large, the trial and error process of testing a series of message structures and rejecting those that do not correspond with the message is relatively time consuming. As will be described in greater detail later, one recursive message structure can flexibly parse more than one inbound message format, such as both of the fixed formats specified by the second and the third fixed message structures 1200, 1300, thereby at least partially avoiding wasting time testing message structures that do not conform to the message.

The second message structure 1200 is shown in the form of a hierarchical tree and flows generally from left to right and top to bottom. A fifth text string, below, is an example of a message that parses into the second message structure 1200:

"\rWidget|PN105|~Shipped^D. Edison@@02/01/00^~Scheduled^F. Glenn@@01/01/00^~"

A sixth text string, below, is an example of a message that parses into the third message structure 1300:

"\rWidget|PN107|~Shipped^H. James@~Ordered^K. Lee@@03/01/00~^04/01/00^~"

Parsing of the fifth and the sixth text string will be described later in connection with FIGS. 15 and 16.

Figure 14:
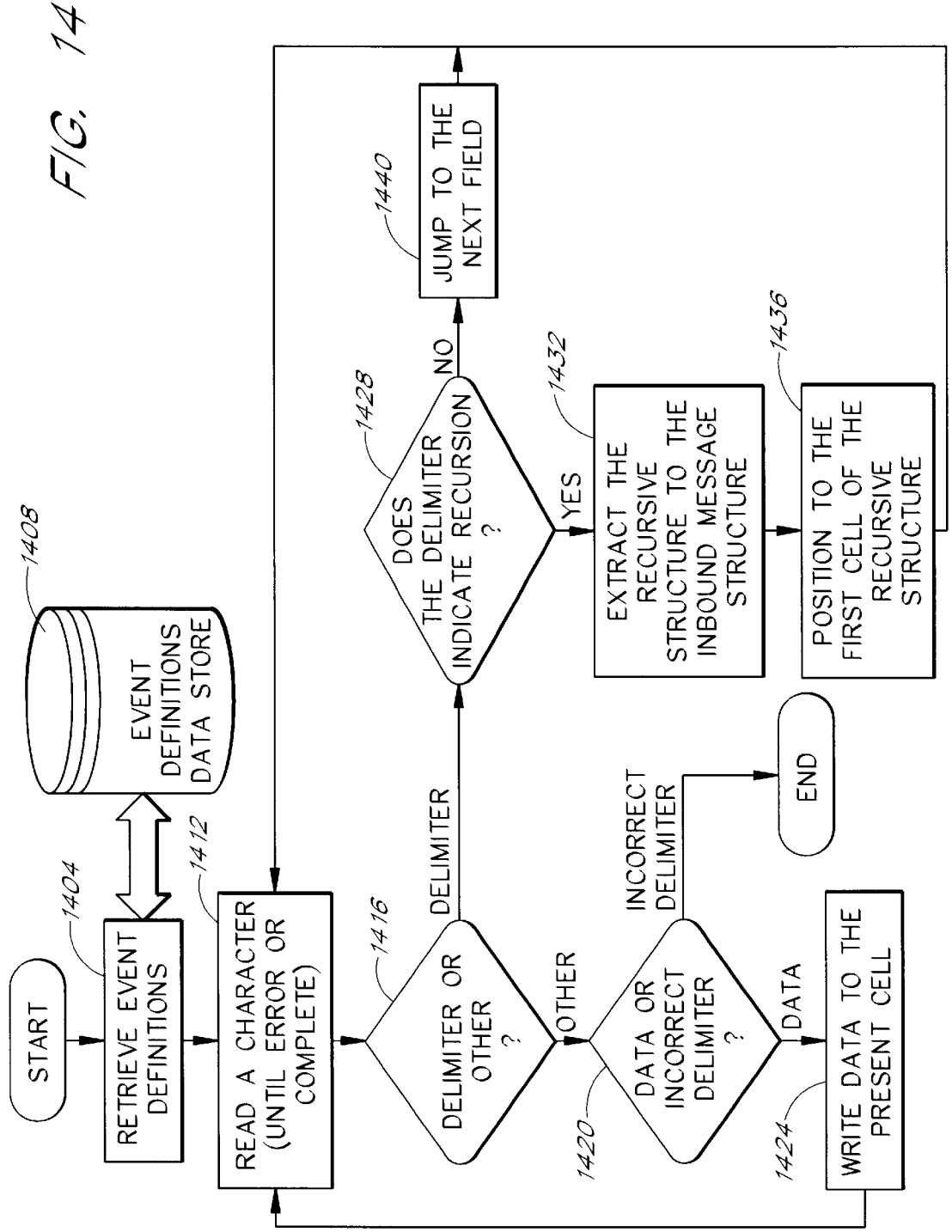
FIG. 14 is a flowchart of recursing a portion of an event definition.

FIG. 14 is a flowchart of a process using end delimiters that flexibly recurses a portion of an event definition to accommodate a variety of inbound message formats. The recursed portion of an event definition can repeat itself to accommodate the inbound message format.

In State 1404, the process retrieves event definitions from an event definitions data store 1408. The event definitions retrieved can include recursive event definitions. The process advances from State 1404 to State 1412.

In State 1412, the process reads a new character from the inbound message and processes the message one character at a time. When all of the characters of the inbound message have been processed, the mapping of the inbound message into the structured event is complete. The process advances from State 1412 to State 1416.

In State 1416, the process determines whether the character read is a delimiter or other. The applicable delimiter for the cell can be stored in the event definition as described in connection with FIG. 6. If the character is other than a delimiter, the process advances from State 1416 to State 1420. If the character is the delimiter, the process advances from State 1416 to State 1428.

In State 1420, the process determines whether the character is defined as data or corresponds to an unrecognized delimiter for the field. If the character is neither data nor recognized as a delimiter, the process results in an error and ends. Other message structures can be tried for compatibility to the inbound message. In one embodiment, the process notes the error in a log and continues to parse the message by treating the unrecognized delimiter as data.

If the character is data, in State 1424, the data is written to the present cell. Of course, when the process is initiated, a pointer indicating the present cell points to the first cell of the array. The process returns from State 1424 to State 1412.

In State 1428, the process determines whether the delimiter indicates recursion applies. The event definition, as described in connection with FIG. 6, can also store information relating to whether a node permits recursion and also the specifications for the recursed portion of the structure. If the delimiter instructs recursion, the process advances from State 1428 to State 1432. If the delimiter does not instruct recursion, the process advances from State 1428 to State 1440.

In State 1432, the process extracts the recursive structure to the inbound message structure. In State 1432, the fields of the recursed structure are committed in memory to array coordinates in the inbound message structure.

In State 1436, the process prepares to write to the first field of the newly added portion of the inbound message structure (the recursed portion) by positioning the pointer to the first cell of the recursed structure to enable writing to the first cell. The process returns from State 1436 to State 1412.

In State 1440, the process prepares to write to the next field of the inbound message by positioning the pointer to the next field. The next field is (a) a first child leaf of the present field, if there is one. If none, the next field is (b) a subsequent sibling leaf, if there is one. If none, the next field is (c) a subsequent sibling field to the parent node of the present leaf, if there is one. If none, the next field is (d) a subsequent sibling field to the grandparent node of the present leaf, if there is one. If none, the next field is (e) a subsequent sibling field to the great-grandparent of the present leaf, if there is one. And so on. The process returns from State 1440 to State 1412.

Figure 15:
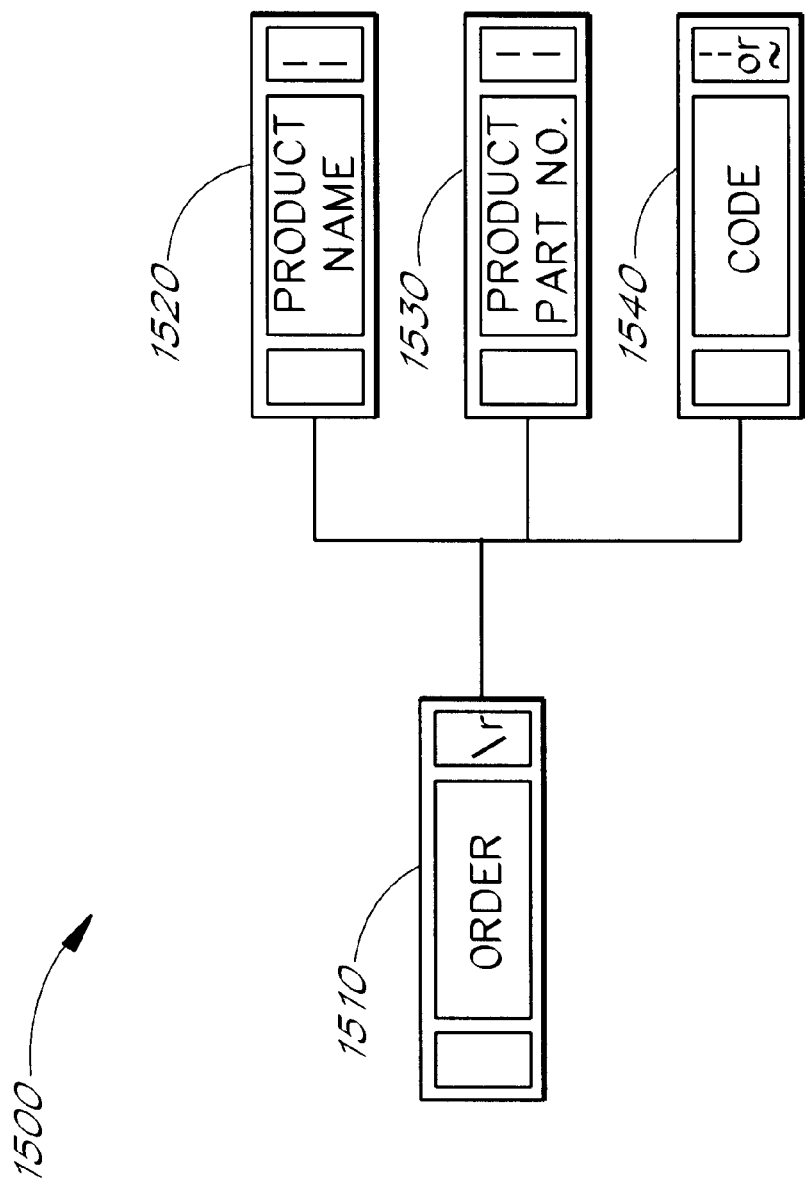
FIG. 15 illustrates an inbound data structure for an event definition.
Figure 16:
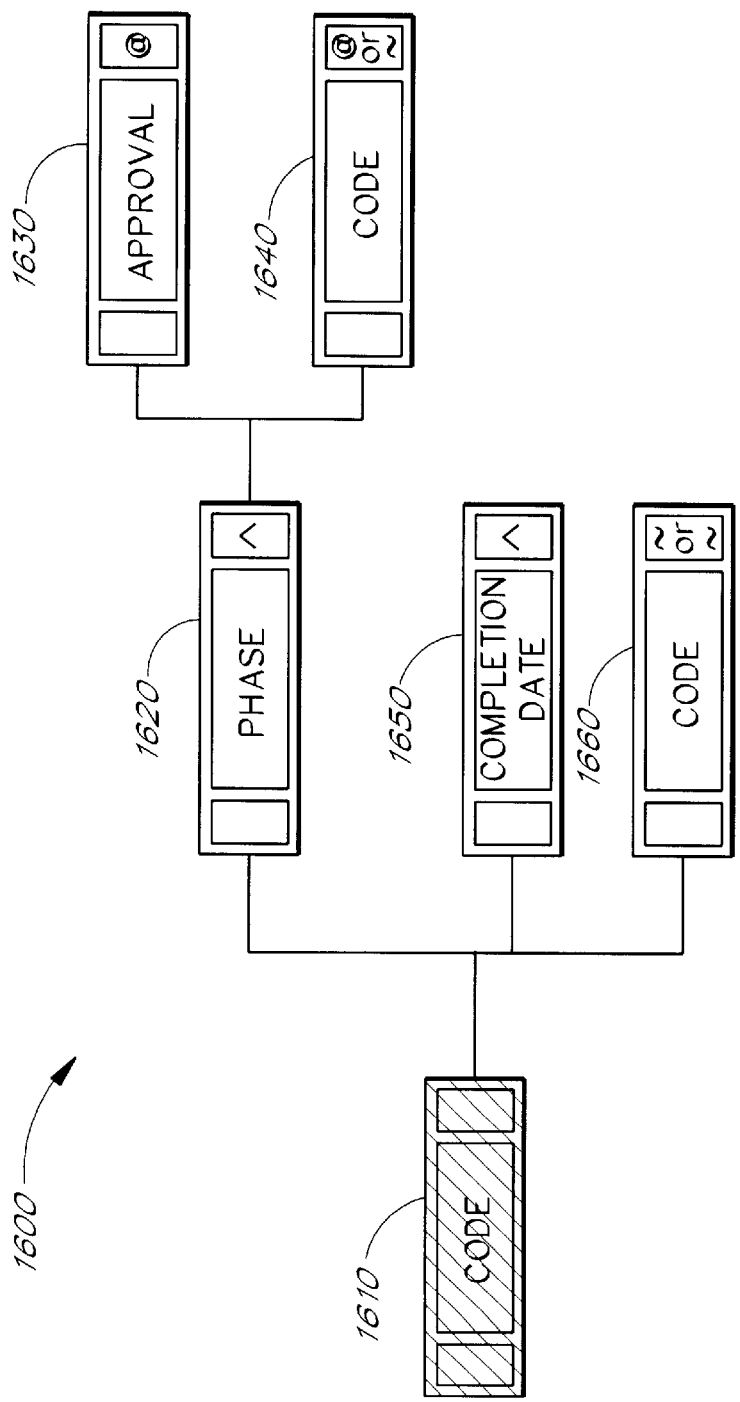
FIG. 16 illustrates a recursive data structure for an event definition.

FIGS. 15 and 16 illustrate an inbound data structure 1500 and a recursive data structure 1600 that can be used with the process described in connection with FIG. 14 to dynamically generate either the second or the third message structure 1200, 1300 in response to either the fifth or the sixth text string operating as the inbound message.

The inbound data structure 1500 includes an order node 1510, which branches to a product name leaf 1520, a product part number leaf 1530, and a first code node 1540. The end delimiters specified for the order node 1510, the product name leaf 1520, and the product part number leaf 1530 are a carriage return character (\r), a pipe character (|), and a pipe character (|) respectively. The first code node 1540 specifies either of two delimiters, the pipe character (|) or the tilde character (~). If the tilde character (~) is encountered during parsing of the inbound message, the process appends the recursive data structure 1600 to the inbound message structure 1500.

The recursive data structure 1600 includes a second code node 1610, a phase node 1620, an approval leaf 1630, a third code node 1640, a completion date field 1650, and a fourth code node 1650. The second code node 1610 does not actually exist but serves to indicate where the process would append the recursive structure. The phase node 1620, the approval leaf 1630, and the completion date node 1650 are respectively end delimited by the characters caret (^), at (@), and caret (^) The third code node 1640 can be end delimited by either a caret (^) or a tilde (~) character. When the inbound message end delimits the third code node 1640 with the tilde (~) character, the process recurses the recursive data structure 1600 at the third code node 1640. Similarly, the fourth code node 1660 can be end delimited by either a caret (^) or a tilde (~) character. When the inbound message end delimits the fourth code node 1660 with the tilde (~) character, the process recurses the recursive data structure 1600 at the fourth code node 1660.

With the forgoing principles in mind, the fifth text string, repeated below, serves as a sample inbound message and will be parsed to a dynamic event definition by the process and structures previously described in connection with FIGS. 14, 15, and 16. The end result is a structured event taking the form of the second inbound message structure 1200, as illustrated in FIG. 12.

"\rWidget|PN105|~Shipped^D. Edison@@02/01/00^~Scheduled^F. Glenn@@01/01/00^"

The inbound message structure 1200 begins as the inbound data structure 1500, i.e., the inbound data structure 1500 is copied to the inbound message structure. The process thus allocates the array memory locations order[0], order[1], and order[2] for a product name leaf 1204, a product part number leaf 1206, and a first code node 1208, respectively. At this point in the process, the order node 1202, which contains the entire array, only branches to the product name leaf 1204, the product part number leaf 1206, and the first code node 1208.

As the message is read, the carriage return (\r) indicates that no data is stored in the order node 1202. "Widget" is parsed to the product name node 1204, and the pipe delimiter (|) is consumed. "PN105" is parsed to the product part number leaf 1206, and the pipe delimiter is consumed.

The next character read is tilde (~), which indicates to the process to append the recursive data structure 1600 to the present inbound message structure. Thus, the process allocates memory for the additional array components of a first phase node 1210, a first approval leaf 1212, a second code node 1214, a first completion date leaf 1216, and a third code node 1218, respectively at array coordinates order[2][0], order[2][0][0], order[2][0][1], order[2][1], and order[2][2].

As the process continues to read the inbound message, "Shipped" is parsed to the first phase node 1210, the caret delimiter (^) is consumed, "D. Edison" is parsed to the first approval leaf 1212, and the at delimiter (@) is consumed. The next character is again an at delimiter (@) and does not match with the tilde delimiter (~), which would cause recursion. Thus, the at delimiter (@) is merely consumed by the second code node 1214 and parsing continues to the next field. Since there are no child fields to the third code node 1214, and no subsequent sibling fields to the second code node 1214, the next field is the completion date field 1216, which is the subsequent sibling field to the parent of the third code node 1214. The "02/01/00" is parsed to the first completion date field 1216, and the caret delimiter (^) is consumed.

The next character is the tilde delimiter (~), which indicates that recursion occurs at the third code node 1218 by adding the structure of the recursive data structure 1600 to the inbound message structure. Thus, the process allocates memory for the additional array components of a second phase node 1220, a second approval leaf 1222, a fourth code node 1224, a second completion date leaf 1226, and a fifth code node 1228, respectively at array coordinates order[2][2][0], order[2][2][0][0], order[2][2][0][1], order[2][2][1], and order[2][2][2].

The process continues to read the inbound message and parses "Scheduled" to the second phase node 1220, consumes the caret delimiter (^), parses "F. Glenn" to the second approval leaf 1222, and consumes at delimiter (@) for the second approval leaf 1222. The process again consumes the subsequent at delimiter (@) without recursing the recursive data structure 1600 because the at delimiter (@) does not match with the tilde (~) delimiter, which would otherwise induce recursion at the fourth code node 1224.

The next field is the second completion date leaf 1226, as there are no child fields to the fourth code node 1224, no subsequent sibling fields to the fourth code node 1224, and the second completion date leaf 1226 corresponds to the subsequent sibling field to the parent node of the fourth code node 1224.

As the process continues to read data, "01/01/00" is parsed in the second completion date leaf 1226, the caret delimiter (^) is consumed for the second completion date leaf 1226, and the caret delimiter (^) is again consumed for the fifth code node 1228. Since the caret delimiter (^) does not match with the tilde delimiter (~), which is the delimiter defined for recursion, no recursion occurs at the fifth code node 1228. Since the message has been completely read and parsed, the parsing process is complete and a structured event has been created.

The same principles will now be applied to parse the sixth text string, repeated below, as if it were the inbound message. The inbound message structure will again be dynamically created with the process and structures previously described in connection with FIGS. 14, 15, and 16. The end result is a structured event taking the form of the second inbound message structure 1300 illustrated in FIG. 13.

"\rWidget|PN107|~Shipped^H. James@~Ordered^K. Lee@@03/01/00^^04/01/00^^38

The inbound message structure 1300 again begins as the inbound data structure 1500. The process thus allocates the array memory locations order2[0], order2[1], and order2[2] for a product name leaf 1304, a product part number leaf 1306, and a first code node 1308, respectively. At this point in the process, the order2 node 1302, which contains the entire array, again only branches to the product name leaf 1304, the product part number leaf 1306, and the first code node 1308.

As the message is read, the carriage return (\r) indicates that no data is stored in the order node 1302. "Widget" is parsed to the product name node 1304, and the pipe delimiter (|) is consumed. "PN107" is parsed to the product part number leaf 1306, and the pipe delimiter is consumed.

The next character read is tilde (~), which indicates to the process to append the recursive data structure 1600 to the present inbound message structure. Thus, the process allocates memory for the additional array components of a first phase node 1210, a first approval leaf 1312, a second code node 1314, a first completion date leaf 1316, and a third code node 1318, respectively at array coordinates order2[2][0], order2[2][0][0], order2[2][0][1], order2[2][1], and order2[2][2].

As the process continues to read the inbound message, "Shipped" is parsed to the first phase node 1310, the caret delimiter (^) is consumed, "H. James" is parsed to the first approval leaf 1312, and the at delimiter (@) is consumed. The next character is the tilde delimiter (~), which causes recursion at the second code node 1314.

The recursion causes the process to append the structure of the recursive data structure 1600 to the inbound message structure. Thus, the process allocates memory for the additional array components of a second phase node 1320, a second approval leaf 1322, a fourth code node 1324, a second completion date leaf 1326, and a fifth code node 1328, respectively, at array coordinates order2[2][0][1][0], order2[2][0][1][0][0], order2[2][0][1][0][1], order2[2][0][1][1], and order2[2][0][1][2].

The next field is then the second phase node 1320, as the second phase node 1320 is the first child field of the second code node 1314. As the reading of the inbound message continues, "Ordered" parses to the second phase code node 1314, the caret delimiter (^) is consumed, "K. Lee" parses to the second approval leaf 1322, and the at delimiter (@) is consumed. Another at delimiter (@) for the fourth code node 1324 indicates that no recursion at the fourth code node 1324 occurs.

The next field is the second completion date node 1326, as there are no child fields to the fourth code node 1324, there are no subsequent sibling fields to the fourth child node 1324, and the second completion date node 1326 is the subsequent sibling field to the parent node of the fourth code node 1324. As the process continues to read the inbound message, "03/01/00" is parsed to the second completion date 1326, and the caret delimiter (^) is consumed. The subsequent caret delimiter (^) for the fifth code node 1328 indicates that no recursion takes place at the fifth code node 1328, and the caret delimiter (^) is consumed.

The next field is the first completion date field 1316. The fifth code node 1328 has no child fields, has no subsequent sibling fields, has no field that is the subsequent field to the parent node of the fifth code node 1328, but has the first completion date field 1316 as the subsequent field to the grandparent node of the fifth code node 1328. As reading of the inbound message continues, the "04/04/00" is parsed to the first completion date field 1316, the caret delimiter (^) consumed for the first completion date field 1316, and the subsequent caret delimiter (^) again consumed for the third code node 1318.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of modifying a behavior of a message structure by definable parsing modifiers, the method comprising:

mapping fields of an event definition to the message structure;

relating at least one field in the event definition to an element of a modifier list;

examining the modifier list to determine whether a field in the event definition corresponds to any element of the modifier list;

parsing for the field in accordance with a default list if no element of the modifier list corresponds with the field; and parsing for the field in accordance with the element of the modifier list when the element corresponds with the field.

2. The method as defined in claim 1, wherein the element comprises a substitute compound character delimiter for a delimiter in the field of the event definition.

3. The method as defined in claim 1, wherein the element comprises a scavenger modifier character, where the scavenger modifier character causes the parsing to eliminate characters corresponding to the scavenger modifier character while mapping to the corresponding fields of the message structure.

4. The method as defined in claim 1, wherein the element comprises a "not tagged"modifier, where the not tagged modifier causes the parsing to eliminate strings that correspond to the not tagged modifier while mapping to the corresponding fields of the message structure.

5. The method as defined in claim 1, wherein the element comprises an array repetition modifier, where the array repetition modifier specifies a range of repetitions that the field in the event definition can take when building the message structure.

6. The method as defined in claim 1, wherein the element comprises a group repetition modifier, where the group repetition modifier identifies groups of fields in the event definition that repeat a number of times specified by the group repetition modifier when building the message structure.

7. The method as defined in claim 1, further comprising:

displaying a graphical representation of the message structure, where fields of the message structure correspond to objects in the display; and enabling a user to define parsing modifiers by drag and drop operation on the display.

8. A method of parsing a message to a hierarchical message structure where the message is parsed to both nodes and leaves of the hierarchical message structure such that a node of the hierarchical message structure contains the content of the -tree that branches from the node, the method comprising:

receiving an inbound message;

retrieving an event definition adapted to parse the inbound message;

determining whether a field is associated with the node or a leaf;

parsing the contents of the tree of the node when the field is associated with the node; and parsing only the content of the field to the leaf when the field is associated with the leaf.

9. The method as defined in claim 8, wherein the field of the inbound message is separated from another field by a delimiter.

10. The method as defined in claim 8, further including mapping the contents of the hierarchical message structure to an outbound message structure upon completion of the parsing to the hierarchical message structure.

11. A method of updating a hierarchical message structure, wherein the message structure contains the contents of a first message in both nodes and leaves, and where the update is a second message, the method comprising:

receiving a pointer, where the pointer indicates a point within the second message where the second message contains updated content;

receiving at least a portion of the second message, where the portion includes the updated content;

parsing the second message to the message structure from the point indicated by the pointer;

deleting a first tree of nodes upon the placement of data into a first parent node of the first tree of nodes; and invalidating data in a second parent node with a second tree upon the placement of data in a field within the second tree of the second parent node.

12. The method as defined in claim 11, further comprising replacing the contents of a parent node, wherein the parent node has a tree, in response to detection of the presence of invalid data in the parent node, and where the contents are replaced by the contents from the nodes that form the tree of the parent node.

13. The method as defined in claim 11, further comprising populating data to an empty node upon detection that the empty node is devoid of data, where the data populated is parsed from a parent node of the empty node.

14. The method as defined in claim 11, wherein the invalidating data comprises deleting data.

15. A method of mapping a message from a first format to a second format, the method comprising:

receiving an inbound message, where the inbound message is formatted in the first format;

receiving an inbound message structure and at least one recursive structure, where the recursive structure can append to the inbound message structure; and recursively extracting the inbound message to an outbound message by formatting the inbound message from the first format to the second format in accordance with the inbound message structure and the recursive structure, where the parsing of the inbound message and the recursions of the recursive structure are indicated by a plurality of delimiters embedded within the inbound message.

16. The method as defined in claim 15, further comprising:

identifying whether a field in the inbound message structure is associated with a node or a leaf;

parsing the contents of multiple fields corresponding to a tree of the node when the field is associated with the node; and parsing only the content of the field when the field is associated with the leaf.

17. The method as defined in claim 15, further comprising:

receiving a query for a node in the inbound message structure for a first content, where the node contains links to children nodes;

accessing the children nodes to collect the content therein; and populating the node with the collected content such that the collected content is available to respond to the query.

18. The method as defined in claim 15, further comprising updating the inbound message structure without receiving all of a new inbound message.

19. The method as defined in claim 15, further comprising receiving a list at runtime, where the list modifies the characteristics of the delimiters such that the list alters the parsing of the inbound message to the inbound message structure.

20. A system that maps a message from a first format to a second format, the system comprising:

means for receiving an inbound message, where the inbound message is formatted in the first format;

means for receiving an inbound message structure and at least one recursive structure, where the recursive structure can append to the inbound message structure; and means for recursively extracting the inbound message to an outbound message by formatting the inbound message from the first format to the second format in accordance with the inbound message structure and the recursive structure, where the parsing of the inbound message and the recursions of the recursive structure are indicated by a plurality of delimiters embedded within the inbound message.

* * * * *

UNITED STATES PATENT AND TRADEMARK OFFICE
CERTIFICATE OF CORRECTION

PATENT NO. : 6,836,890 B1
DATED : December 28, 2004
INVENTOR(S) : Watts, Jr. et al.

It is certified that error appears in the above-identified patent and that said Letters Patent is hereby corrected as shown below:

Column 21,
Line 58, replace "content of the –tree that branches from the node, the method" with -- content of the tree that branches from the node, the method --

Signed and Sealed this

Twenty-first Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,836,890 B1
DATED : December 28, 2004
INVENTOR(S) : Watts, Jr. et al.

It is certified that error appears in the above-identified patent and that said Letters Patent is hereby corrected as shown below:

Title page,
Item [73], Assignee, replace "Seebeyond Techonogy Corporation," with
-- SeeBeyond Technology Corporation, --.

Signed and Sealed this

Twenty-fifth Day of October, 2005

JON W. DUDAS
*Director of the United States Patent and Trademark Office*